US012646812B2

(12) United States Patent
Choi et al.

(10) Patent No.: US 12,646,812 B2
(45) Date of Patent: Jun. 2, 2026

(54) PHASE SHIFTER USING DIELECTRIC AND ELECTRONIC DEVICE INCLUDING THE SAME

(71) Applicant: Samsung Electronics Co., Ltd., Suwon-si (KR)

(72) Inventors: Seungho Choi, Suwon-si (KR); Yoongeon Kim, Suwon-si (KR); Seokmin Lee, Suwon-si (KR); Seungtae Ko, Suwon-si (KR); Junsig Kum, Suwon-si (KR); Jungyub Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 18/185,937

(22) Filed: Mar. 17, 2023

(65) Prior Publication Data

US 2023/0361441 A1 Nov. 9, 2023

Related U.S. Application Data

(63) Continuation of application No. PCT/KR2023/003046, filed on Mar. 6, 2023.

(30) Foreign Application Priority Data

May 6, 2022 (KR) ........................ 10-2022-0056290
May 31, 2022 (KR) ........................ 10-2022-0067257

(51) Int. Cl.
*H01P 1/18* (2006.01)
*H01P 5/12* (2006.01)
*H01Q 3/32* (2006.01)

(52) U.S. Cl.
CPC ................ *H01P 1/184* (2013.01); *H01P 5/12* (2013.01); *H01Q 3/32* (2013.01)

(58) Field of Classification Search
CPC .. H01P 1/184; H01P 5/12; H01Q 3/32; H01Q 1/246
See application file for complete search history.

(56) References Cited

U.S. PATENT DOCUMENTS 7,589,603 B2 9/2009 Tae et al.
11,349,184 B2 5/2022 Kim et al.
(Continued)

FOREIGN PATENT DOCUMENTS

CN 107482286 A 12/2017
CN 108879035 A 11/2018
(Continued)

OTHER PUBLICATIONS

International Search Report with Written Opinion dated Jun. 8, 2023, issued in International Patent Application No. PCT /KR2023/ 003046.

(Continued)

*Primary Examiner* — Andrea Lindgren Baltzell
*Assistant Examiner* — Kimberly E Glenn
(74) *Attorney, Agent, or Firm* — Jefferson IP Law, LLP

(57) ABSTRACT

A phase shifter module is provided. The phase shifter module includes a dielectric, a plate, and a PCB including a metal pattern. The metal pattern includes a power divider having first and second transmission branches. The first transmission branch includes a first structure formed between a branch point of the power divider and an output terminal of the first transmission branch. The second transmission branch includes a second structure formed between the branch point of the power divider and the output terminal of the first transmission branch. The dielectric is disposed to overlap at least one of at least a portion of the first structure or at least a portion of the second structure. The dielectric is flexibly disposed so that a first region where the dielectric (Continued)

overlaps the first structure and a second region where the dielectric overlaps the second structure vary, according to movement of the plate.

18 Claims, 16 Drawing Sheets

(56) References Cited

U.S. PATENT DOCUMENTS

| | | | | |
|---|---|---|---|---|
| 2010/0156557 | A1* | 6/2010 | Chang | H01P 1/184 333/136 |
| 2012/0105299 | A1 | 5/2012 | Goettl et al. | |
| 2017/0041038 | A1* | 2/2017 | Kirkpatrick | H04B 1/48 |
| 2017/0346183 | A1 | 11/2017 | Kim et al. | |
| 2021/0194124 | A1 | 6/2021 | Kim et al. | |

FOREIGN PATENT DOCUMENTS

| | | | | | |
|---|---|---|---|---|---|
| CN | 111180892 | A | | 5/2020 | |
| CN | G/111342175 | A | | 6/2020 | |
| CN | 111490317 | A | | 8/2020 | |
| CN | 113328217 | A | | 8/2021 | |
| CN | 113540794 | A | | 10/2021 | |
| CN | 113823884 | A | | 12/2021 | |
| EP | 0 456 579 | A1 | | 11/1991 | |
| EP | 3 879 628 | A1 | | 9/2021 | |
| JP | 2014-36372 | A | | 2/2014 | |
| KR | 10-2005-0008882 | A | | 1/2005 | |
| KR | 10-0562534 | B1 | | 3/2006 | |
| KR | 10-2009-0035314 | A | | 4/2009 | |
| KR | 10-2021-0081123 | A | | 7/2021 | |
| KR | 10-2443048 | B1 | | 9/2022 | |
| WO | WO-2022207063 | A1 | * | 10/2022 | H01Q 3/32 |

OTHER PUBLICATIONS

Extended European Search Report dated Apr. 3, 2025, issued in European Application No. 23799545.1-1201

.

* cited by examiner

PHASE SHIFTER USING DIELECTRIC AND ELECTRONIC DEVICE INCLUDING THE SAME

CROSS-REFERENCE TO RELATED APPLICATION(S)

This application is a continuation application, claiming priority under § 365(c), of an International application No. PCT/KR2023/003046, filed on Mar. 6, 2023, which is based on and claims the benefit of a Korean patent application number 10-2022-0056290, filed on May 6, 2022, in the Korean Intellectual Property Office, and of a Korean patent application number 10-2022-0067257, filed on May 31, 2022, in the Korean Intellectual Property Office, the disclosure of each of which is incorporated by reference herein in its entirety.

TECHNICAL FIELD

The disclosure relates to a phase shifter. More particularly, the disclosure relates to a phase shifter using a dielectric and an electronic device including the same.

BACKGROUND ART

As one of the technologies for mitigating the propagation-path loss and increasing the propagation distance of radio waves, a beamforming technique is in use. Beamforming is generally adapted to concentrate a reach area of radio waves using a plurality of antennas or increase the directivity of reception sensitivity in a certain direction. For operating such a beamforming technique, a communication node may be equipped with multiple antennas. Further, a phase shifter may be used to establish a required beam coverage through multiple antennas.

The above information is presented as background information only to assist with an understanding of the disclosure. No determination has been made, and no assertion is made, as to whether any of the above might be applicable as prior art with regard to the disclosure.

DISCLOSURE

Technical Solution

In accordance with an aspect of the disclosure, a module including a phase shifter is provided. The module includes a dielectric, a plate, and a printed circuit board (PCB) including a metal pattern. The metal pattern includes a power divider having a first transmission branch and a second transmission branch. The first transmission branch includes a first structure formed between a branch point of the power divider and an output terminal of the first transmission branch. The second transmission branch includes a second structure formed between the branch point of the power divider and the output terminal of the first transmission branch. The dielectric is disposed to overlap at least one of at least a portion of the first structure or at least a portion of the second structure. The dielectric is flexibly disposed so that a first region where the dielectric overlaps the first structure and a second region where the dielectric overlaps the second structure vary according to movement of the plate.

In accordance with another aspect of the disclosure, an electronic device is provided. The electronic device includes a power source, at least one processor, at least one filter, an antenna printed circuit board (PCB), and an array antenna including a plurality of sub-arrays. The antenna PCB includes a dielectric, a plate, and a PCB including a metal pattern, for each sub-array. The metal pattern includes a power divider having a first transmission branch and a second transmission branch. The first transmission branch includes a first structure formed between a branch point of the power divider and an output terminal of the first transmission branch. The second transmission branch includes a second structure formed between the branch point of the power divider and the output terminal of the first transmission branch. The dielectric is disposed to overlap at least one of at least a portion of the first structure or at least a portion of the second structure. The dielectric is flexibly disposed so that a first region where the dielectric overlaps the first structure and a second region where the dielectric overlaps the second structure vary according to movement of the plate.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

Figure 1:
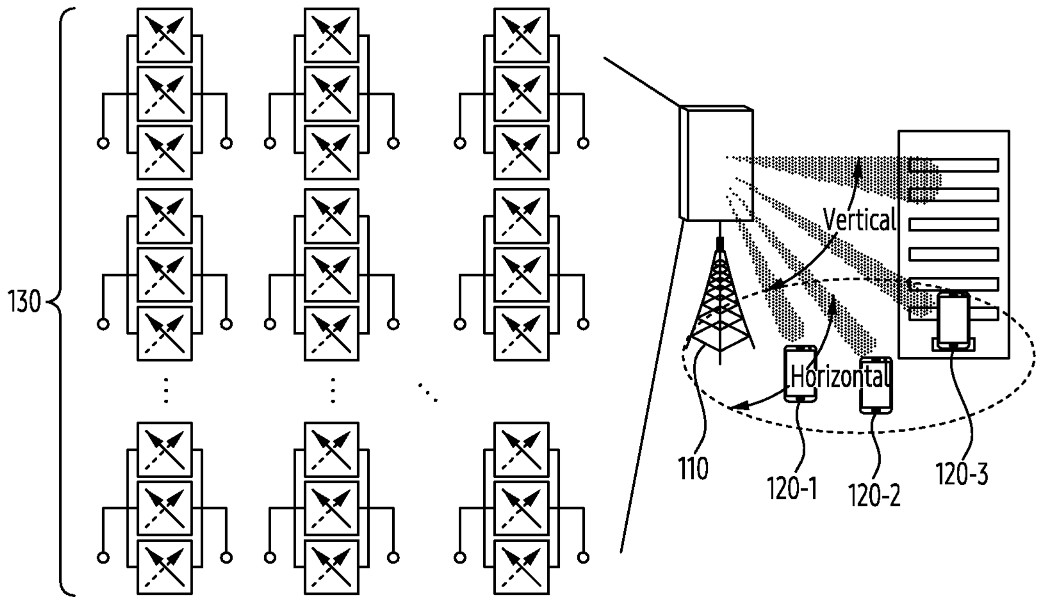
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include a technology that utilizes both the hardware-based and the software-based approaches, they are not intended to exclude the software-based approach.

As used in the following description, the terms referring to parts of an electronic device (e.g., substrate, printed circuit board (PCB), flexible PCB (FPCB), module, antenna, antenna element, circuit, processor, chip, component, device, and the like), the terms referring to a shape of parts (e.g., structure, body, support, contact, protrusion, and the like), the terms referring to a connection between structures (e.g., connection, contact, support, contacting structure, conductive member, assembly, and the like), the terms referring to a circuit (e.g., PCB, FPCB, signal line, feeding line, transmission line, transmission channel, data line, RF signal line, antenna line, RF path, RF module, RF circuit, splitter, divider, coupler, combiner, and the like), or the like are illustrated for convenience of description in the disclosure. Therefore, the disclosure is not limited to those terms described below, and other terms having an equivalent technical meaning may be used therefor. Further, the terms such as '~ module', '~ unit', '~ part', '~ body', and the like may refer to at least one shape of structure or at least one unit for processing a certain function.

Further, throughout the disclosure, an expression such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression such as 'above', a condition described as 'less than or equal to' may be replaced with an expression such as 'below', and a condition described as 'more than or equal to' and 'below' may be replaced with 'above' and 'less than or equal to', respectively.

The disclosure is to provide a phase shifter implemented as a 4-port for flexible deployment and an electronic device including the same.

The disclosure is to provide a phase shifter using a dielectric flexibly disposed across transmission branches of a power divider, for designing a 4-port phase shifter and an electronic device including the same.

The disclosure is to provide a conductive pattern including a bending structure of a transmission line and a rotating dielectric, for implementing a phase shifter with a relatively smaller area.

A phase shifter according to embodiments of the disclosure and an electronic device including the phase shifter can secure flexibility of deployment through a 4-port phase shifter.

A phase shifter according to embodiments of the disclosure and an electronic device including the phase shifter can provide its reduced volume and robust manufacturing tolerance, owing to rotation of a dielectric and a conductive pattern having a specific structure.

The effects that can be obtained from the disclosure are not limited to those described above, and any other effects not mentioned herein will be clearly understood by those having ordinary skill in the art to which the disclosure belongs, from the following description.

FIG. 1 illustrates a wireless communication system according to an embodiment of the disclosure. The wireless communication environment of FIG. 1 illustrates a base station 110 and a terminal 120 (e.g., the first terminal 120-1, the second terminal 120-2, th third terminal 120-3) as parts of nodes using a wireless channel.

Referring to FIG. 1, a base station 110 is a network infrastructure that provides wireless access to the terminal 120. The base station 110 has coverage based on a distance capable of transmitting a signal. In addition to the base station, the base station 110 may be referred to as 'access point (AP), eNodeB (eNB), '5th generation node', 5G NodeB (5G NB), wireless point, transmission/reception point (TRP), access unit, distributed unit (DU), radio unit (RU), remote radio head (RRH), or other terms having an equivalent technical meaning. The base station 110 may transmit a downlink signal or receive an uplink signal.

A terminal 120-1, a terminal 120-2, or a terminal 120-3 is a device used by a user and communicates with the base station 110 through a wireless channel. Hereinafter, a description of the terminal 120-1, the terminal 120-2, or the terminal 120-3 will be described by referring to the terminal 120. In some cases, the terminal 120 may be operated without user involvement. That is, the terminal 120 is a device that performs machine type communication (MTC) and may not be carried by a user. The terminal 120 may be referred to as 'user equipment (UE)', 'mobile station', 'subscriber station', 'customer premises equipment (CPE), 'remote terminal', 'wireless terminal', 'electronic device', or 'terminal for vehicle', 'user device', or other terms having an equivalent technical meaning in addition to the terminal.

As one of the technologies for mitigating radio wave path loss and increasing the transmission distance of radio waves, beamforming technology may be used. Beamforming generally uses a plurality of antennas to concentrate the reach area of the radio wave or increase the directivity of the reception sensitivity with respect to a specific direction. Therefore, the base station 110 may have a plurality of antennas, in order to form a beamforming coverage instead of forming a signal in an isotropic pattern using a single antenna. According to an embodiment, the base station 110 may include a Massive multiple input multiple output (MIMO) Unit (MMU). A form in which a plurality of antennas are assembled may be referred to as an antenna array 130, and each antenna included in the array may be referred to as an array element or an antenna element. The antenna array 130 may be configured in various forms such as a linear array, a planar array, and the like. The antenna array 130 may be referred to as a massive antenna array.

The main technology for improving the data capacity of 5G communication is beamforming technology that uses antenna arrays connected to a plurality of RF paths. For higher data capacity, the number of RF paths should be increased or the power of the RF paths should be increased. Increasing the RF path will increase the size of the product, but it is currently at a level that may no longer be increased due to spatial constraints in installing actual base station equipment. In order to increase antenna gain through high output without increasing the number of RF paths, antenna gain may be increased by connecting a plurality of antenna elements to the RF path using a divider (or splitter). An antenna element corresponding to the RF path may be referred to as a sub-array.

The number of antennas (or antenna elements) of equipment (e.g., the base station 110) that performs wireless communication to improve communication performance is increasing. In addition, since the number of RF parts (e.g., amplifiers, filters) and components for processing RF signals received or transmitted through antenna elements increases, spatial gains and cost-effectiveness are also essential along with communication performance, when configuring communication equipment.

Hereinafter, in order to describe a matching network of an antenna element and an electronic device including the same, the base station 110 of FIG. 1 is described as an example, but embodiments are not limited thereto. According to embodiments of the disclosure, in addition to the base station 110, wireless equipment that performs functions equivalent to the base station, wireless equipment connected to the base station (e.g., TRP), the terminal 120 in FIG. 1, or any other communication equipment used for 5G communication may serve as a matching network and an electronic device including the same.

Hereinafter, an antenna array composed of sub-arrays will be described as an example as a structure of a plurality of antennas for communication in a multiple input multiple output (MIMO) environment, an easy modification for beamforming is possible in some embodiments.

Figure 2A:
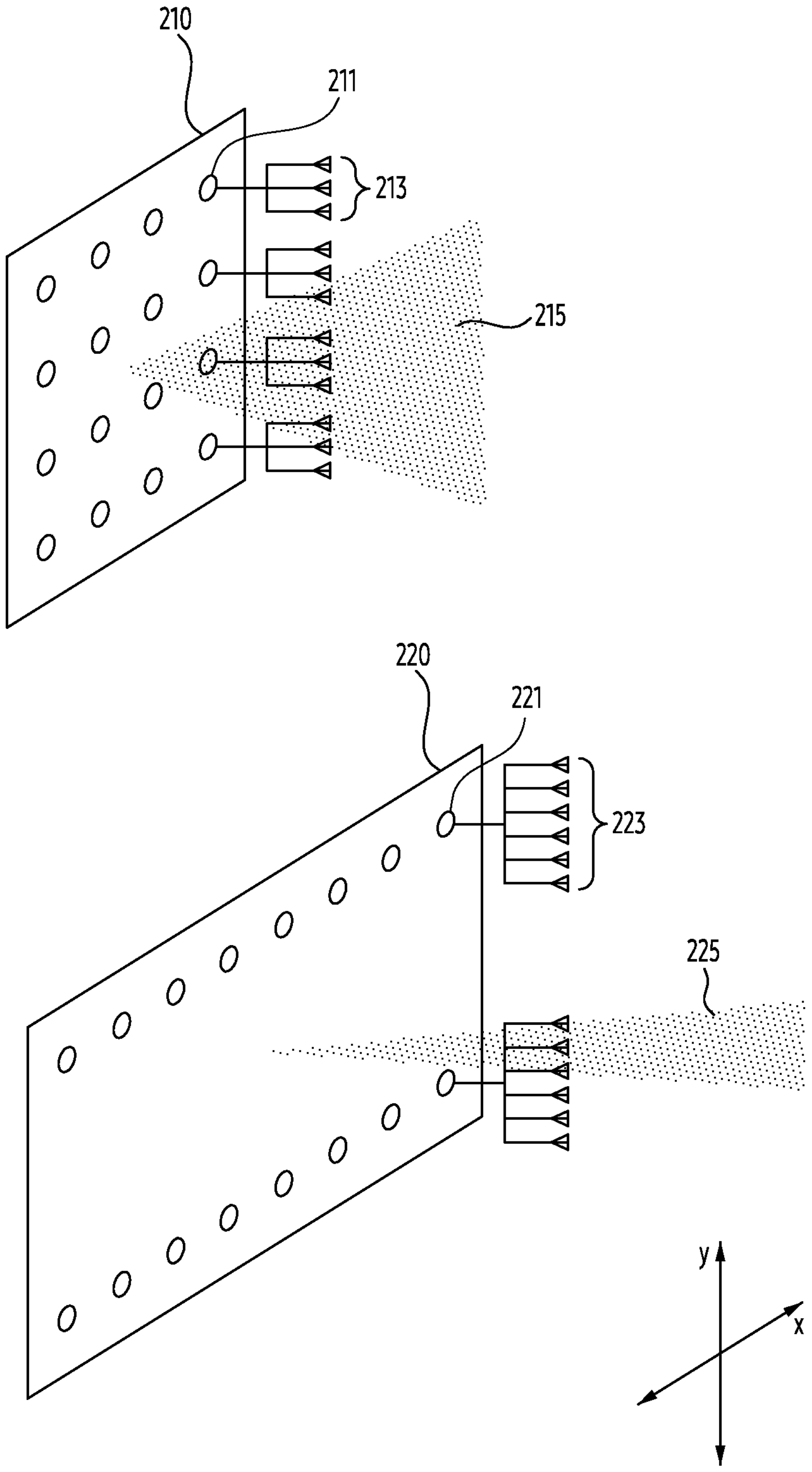
FIG. 2A illustrates examples of port arrangements according to an embodiment of the disclosure.

FIG. 2A illustrates examples of port arrangements according to an embodiment of the disclosure. Referring to FIG. 2A, description is made of beam coverage according to the port arrangements.

Referring to FIG. 2A, a first antenna array 210 may include 16 ports. A port may correspond to a signal source. For example, the first antenna array 210 includes 16 ports (e.g., port 211) arranged in a 4×4 pattern. In a two-dimensional antenna array, four ports are arranged along a horizontal axis and four ports are arranged along a vertical axis. A single port 211 may be coupled with one sub-array 213. The sub-array 213 may include a plurality of antenna elements. For example, one sub-array includes three antenna elements. For example, the one sub-array has a 3×1 arrangement. The first antenna array 210 may include 48 antenna elements. The first antenna array 210 may provide a beam coverage 215. To increase the antenna gain, a larger number of antenna elements per port may be required.

A second antenna array 220 may include 16 ports. As the number of antenna elements in a sub-array increases, its antenna gain increases, while a physical distance between the ports may increase. For example, the first antenna array 210 includes 16 ports (e.g., port 221) arranged in a 2×8 pattern. In the two-dimensional (2D) antenna array, eight ports may be arranged along a horizontal axis and two ports may be arranged along a vertical axis. One port 221 may be coupled with one sub-array 223. The sub-array 223 may include a plurality of antenna elements. For example, one sub-array includes 6 antenna elements. For example, the sub-array has a 6×1 arrangement. The second antenna array 220 may include 96 antenna elements. The second antenna array 220 may provide a beam coverage 225. As the total number of these antenna elements increases, the gain of the second antenna array 220 may be higher than that of the first antenna array 210.

As a physical distance between ports increases, its beam width decreases. The number of antenna elements of the first antenna array 210 arranged in y-axis direction is 12. The number of antenna elements of the second antenna array 220 arranged in y-axis direction is 12. However, in the 2D antenna array, the number of ports decreases from 4 to 2 with respect to the y-axis. As the number of ports decreases, it may have decreased precision in phase adjustment. As the phase values supplied to the antenna elements vary, various beams may be formed. In other words, low precision of phase adjustment provides narrower beam coverage. A phase shifter may be used to minimize such a problem of narrow beam coverage.

Figure 2B:
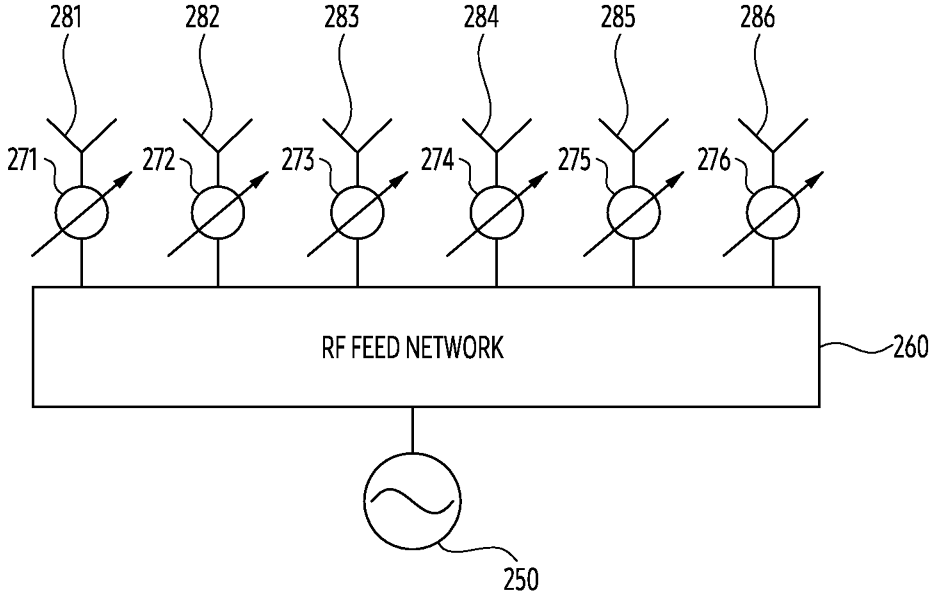
FIG. 2B illustrates examples of functional configurations of a radio frequency (RF) path according to an embodiment of the disclosure.

FIG. 2B illustrates examples of a functional configuration of a radio frequency (RF) path according to an embodiment of the disclosure. The RF path refers to a path through which an RF signal is transmitted from a signal source to an antenna element. Hereinafter, an example is described in which one sub-array includes 6 antenna elements.

Referring to FIG. 2B, a signal source 250 may transmit RF signals to antenna elements (e.g., a first antenna element 281, a second antenna element 282, a third antenna element, a fourth antenna element 284, a fifth antenna element 285, and the sixth antenna element 286) through an RF feed network 260.

Each antenna element may have an independent phase value. Logically, an antenna element may be coupled with a phase shifter. The RF signal from the signal source 250 may be transmitted to the first antenna element 281 through a first phase shifting 271. The RF signal from the signal source 250 may be transmitted to the second antenna element 282 through a second phase shifting 272. The RF signal from the signal source 250 may be transmitted to the third antenna element 283 through a third phase shifting 273. The RF signal from the signal source 250 may be transmitted to the fourth antenna element 284 through a fourth phase shifting 274. The RF signal from the signal source 250 may be transmitted to the fifth antenna element 285 through a fifth phase shifting 275. The RF signal from the signal source 250 may be transmitted to the sixth antenna element 286 through a sixth phase shifting 276.

Signals radiated through a phase value applied to each antenna element may be overlapped with each other, and the overlapped signals form a beam. Boresight or shape of a beam formed may vary according to the phase values (i.e., phase pattern) applied to antenna elements. An electronic device according to embodiments of the disclosure may include an antenna array equipped with a phase shifter so that an effective beam coverage of the array antenna does not decrease due to an increase in the distance between ports.

Figure 3:
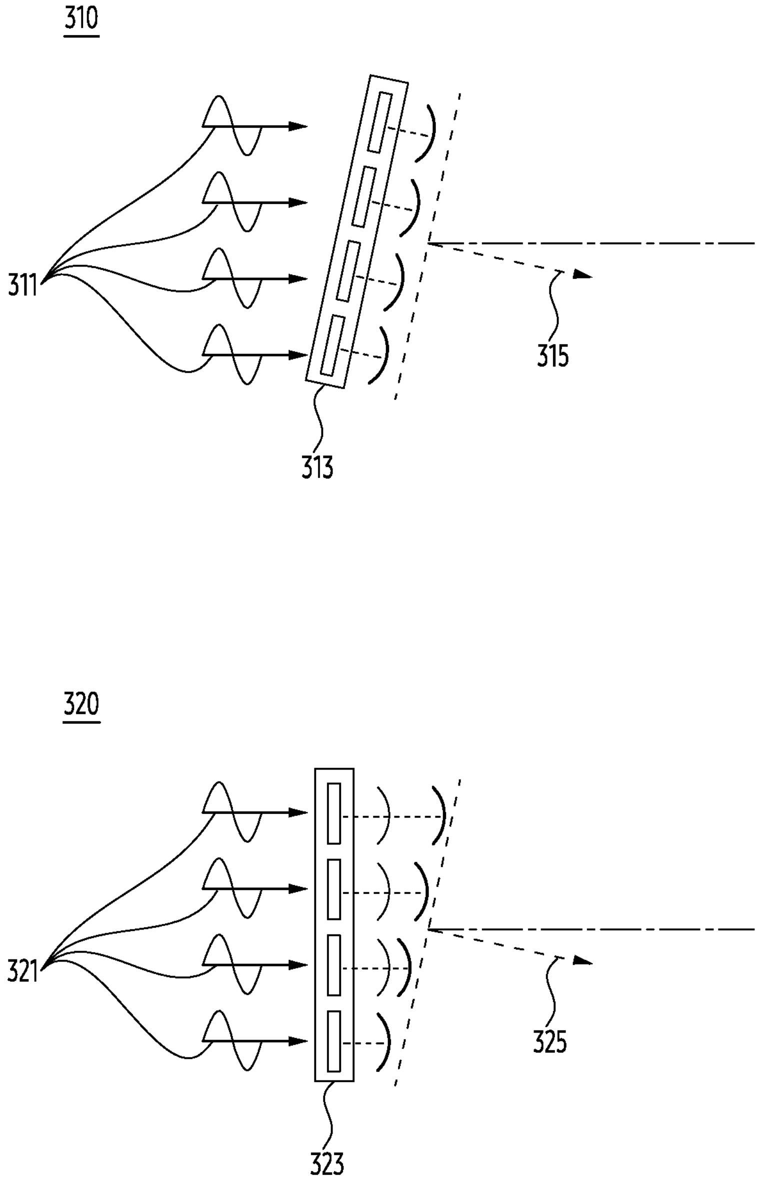
FIG. 3 illustrates examples of a phase shifting technique according to an embodiment of the disclosure.

FIG. 3 illustrates examples of a phase shifting technique according to an embodiment of the disclosure.

Referring to FIG. 3, the phase shifting technique may be either of a mechanical tilt technique 310 or of an electrical tilt technique 320. The mechanical tilting technique 310 may provide adjustment of a beamforming angle 315 at which signals 311 fed to the antennas are radiated, by tilting a base station 313. The electrical tilting technique 320 may provide adjustment of a beamforming angle 325, by varying an electrical length of signals 321 fed to the antennas. In the electrical tilting technique, a base station 323 may not tilt.

In this disclosure, description is made of the electrical tilting technique 320 that uses a change in the electrical length experienced by an RF signal, instead of the mechanical tilting technique 310. The electrical tilting technique 320 may be performed by an electrical phase shifter using transmission lines providing different phase shifting or a mechanical phase shifter (MPS) using mechanical movement. The mechanical phase shifter may provide less loss than the electrical phase shifter. An electronic device according to embodiments of the disclosure may include such a mechanical phase shifter to provide a higher gain. Meanwhile, since the mechanical phase shifter has a larger volume or weight than the electrical phase shifter, description will be made of a structure of the phase shifter for miniaturization thereof in the following disclosure.

Figure 4A:
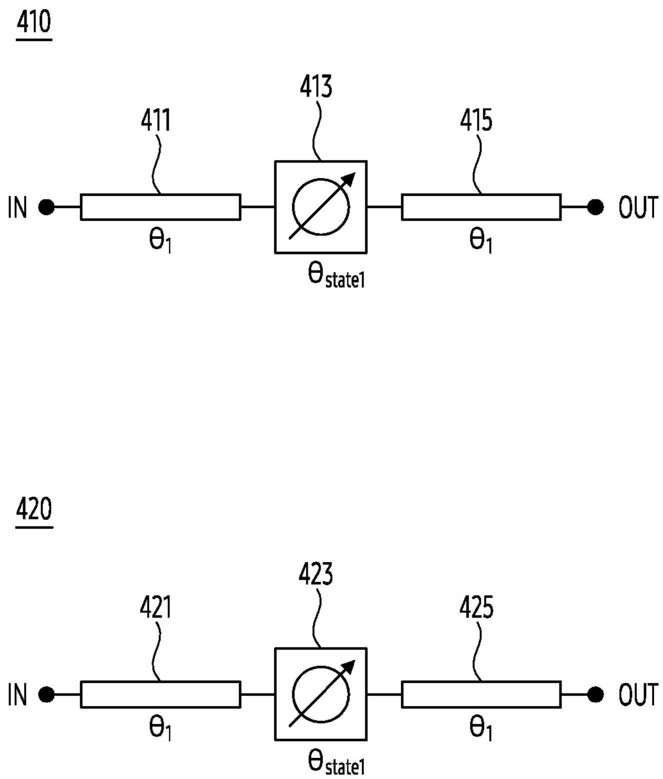
FIG. 4A is a schematic diagram for explaining an operation principle of a phase shifter according to an embodiment of the disclosure.

FIG. 4A is a schematic diagram for explaining an operation principle of a phase shifter according to an embodiment of the disclosure. When the electrical length between an input terminal and an output terminal is different, the phase of the output signal varies, even if it is the same input signal. The phase shifter may be designed to have a varying phase difference between the antennas by changing its electrical length.

Referring to FIG. 4A, in a first state 410, a transmission line 411, a phase shifter 413, and a transmission line 415 may be disposed between an input terminal and an output terminal. The transmission line 411 may convert a phase of θ1 in magnitude. The phase shifter 413 may convert a phase of θstate, 1 in magnitude. The transmission line 415 may convert a phase of θ1 in magnitude. In the first state 410, the total phase change between the input and the output may correspond to a magnitude of 2*θ1+θstate,1.

In a second state 420, a transmission line 421, a phase shifter 423, and a transmission line 425 may be disposed between the input terminal and the output terminal. The transmission line 421 may convert a phase of θ1 in magnitude. The phase shifter 423 may convert a phase of θstate,2 in magnitude. The transmission line 425 may convert a phase of θ1 in magnitude. In the second state 420, the total phase change between input and output may correspond to a magnitude of 2*θ1+θstate,2.

The phase difference 40 in between the first state 410 and the second state 420 may be expressed by the following equation.

$$\Delta\theta=(2*\theta_1+\theta_{state,1})-(2*\theta_1+\theta_{state,2})=\theta_{state,1}-\theta_{state,2} \quad \text{Equation 1}$$

The phase shifter may convert the phase of the output by generating a phase difference (e.g., Δθ) in between the states. The phase shifter is a component that changes the electrical length of a specific section, i.e., the phase, according to a state. The phase may be expressed as in the following equation.

$$\theta=\omega\sqrt{\mu\varepsilon}\cdot l=\omega\sqrt{LC}\cdot l \quad \text{Equation 2}$$

wherein, 'θ' denotes a phase, 'ω' denotes a frequency, 'μ' denotes a magnetic permeability, 'ε' denotes a permittivity, 'l' denotes a physical length, and 'L' denotes an inductance, and 'C' denotes a capacitance.

The frequency of the input signal is a fixed environmental variable and therefore, the permeability is not easy to change. Therefore, the phase shifter according to the embodiments of the disclosure may change the phase by adjusting the dielectric constant (ε) or the physical length (l), or by adjusting the inductance (L) or the capacitance (C) through circuit elements.

The mechanical phase shifter may be a conductor type of phase shifter or a dielectric type of phase shifter. The conductor type of phase shifter includes contact between metals. Since a transmission line made of metal acts to depress a metal plate, metal powder may be generated due to friction between the metals. In order to reduce the effect of metal powder, a dielectric thin film may be required on a metal-to-metal contacting surface. However, as the number of antenna elements and RF paths increases, the number of phase shifters required for an electronic device also increases. If the dielectric film is thick, then its signal transmission becomes difficult, and if the dielectric film is thin, then its performance becomes sensitive depending on fabrication errors. That is to say, due to a small gap of coupling, the conductor type of phase shifters may have poor performance stability. Further, as the thickness of the dielectric thin film is not easy to manage during fabrication, the conductor type of phase shifters may not be suitable for mass production. Therefore, for phase shifting according to embodiments of the disclosure, a dielectric-type phase shifter (i.e., a phase shifter using a dielectric) may be used.

Figure 4B:
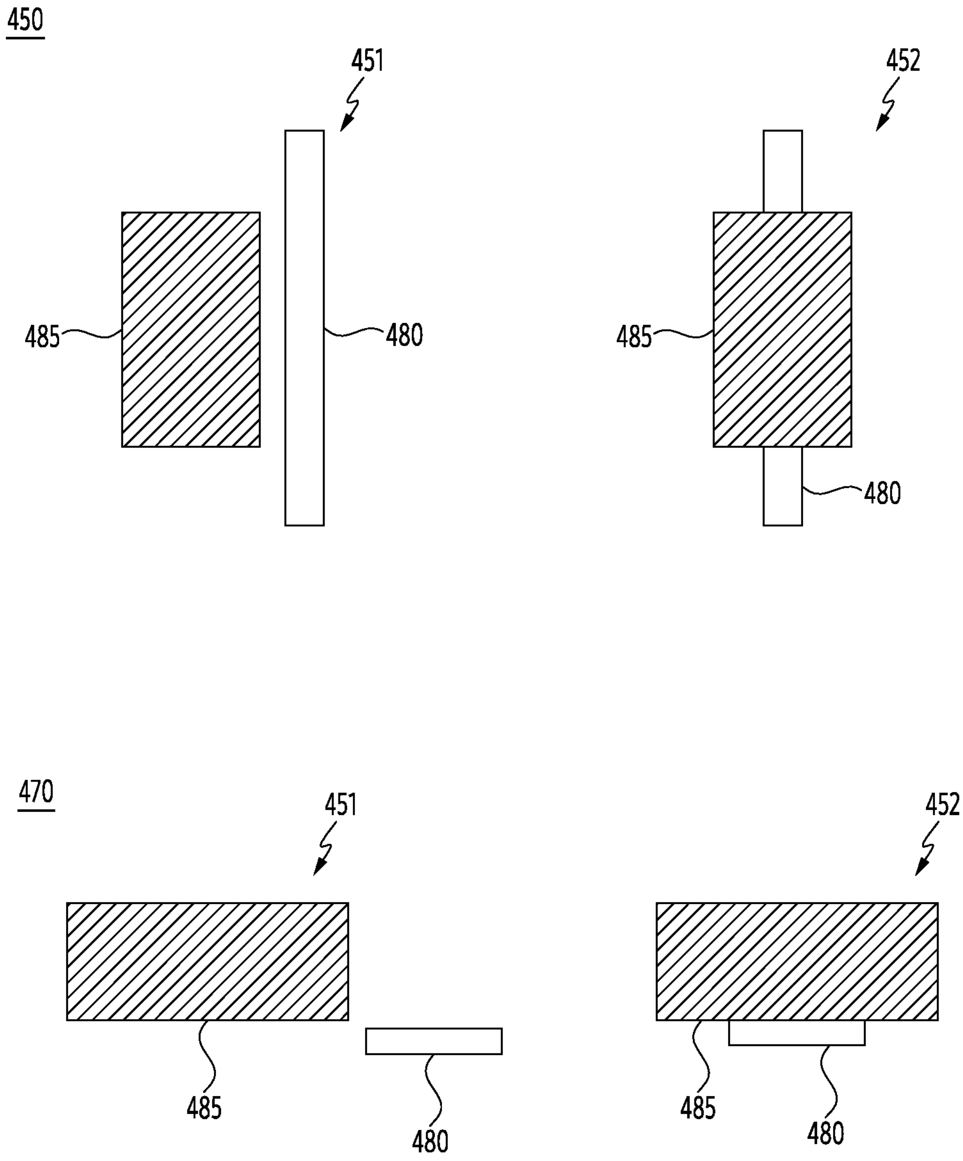
FIG. 4B is a diagram for explaining an operation principle of a phase shifter using a dielectric according to an embodiment of the disclosure.

FIG. 4B is a schematic diagram for explaining an operation principle of a phase shifter using a dielectric according to an embodiment of the disclosure.

Referring to FIG. 4B, the phase shifter uses a scheme of changing a dielectric environment of a transmission line rather than changing a physical length of the transmission line, for converting the phase of a signal. The phase shifter may include a transmission line 480 and a dielectric 485. A view 450 is a schematic plan view of the phase shifter viewed from above. A view 470 is a schematic vertical view of the phase shifter viewed from the side. In a first state 451, the dielectric 485 may be disposed at a position spaced apart from the transmission line 480 by a predetermined distance or more. In a second state 452, the transmission line 480 may be positioned spaced less than a certain distance from the dielectric 485. As the dielectric 485 gets closer to the transmission line 480, the equivalent permittivity of the transmission line 480 may increase. As mentioned in the Equation 2 above, when the equivalent permittivity increases, the phase increases accordingly. Thus, the phase shifter can provide a phase difference in between different states (e.g., the first state 451 and the second state 452).

In the phase shifter using the dielectric, because friction between the transmission line made of metal and the dielectric occurs, metal powder may not be generated, as opposed to the conductor type of phase shifter. Furthermore, since its performance is not dependent on a thin dielectric (e.g., a dielectric thin film) located between the two metals, the phase shifter using a dielectric may provide a relatively robust fabrication error. Hereinafter, unless specifically defined otherwise in the disclosure, the phase shifter refers to a phase shifter using a dielectric. Prior to describing the phase shifter using a dielectric according to embodiments of the disclosure, the dielectric described herein may be referred to by various terms. In describing a use, a shape, or a deployment of the dielectric, the terms such as dielectric structure, dielectric medium, dielectric lump, dielectric chunk, dielectric puck and so on may be used interchangeably. Since the phase shifter using a dielectric requires deployment of the dielectric, more efficient use of space is also required. Accordingly, according to embodiments of the disclosure, proposed is a phase shifter for a structure with a relatively smaller volume or lighter weight.

Figure 5:
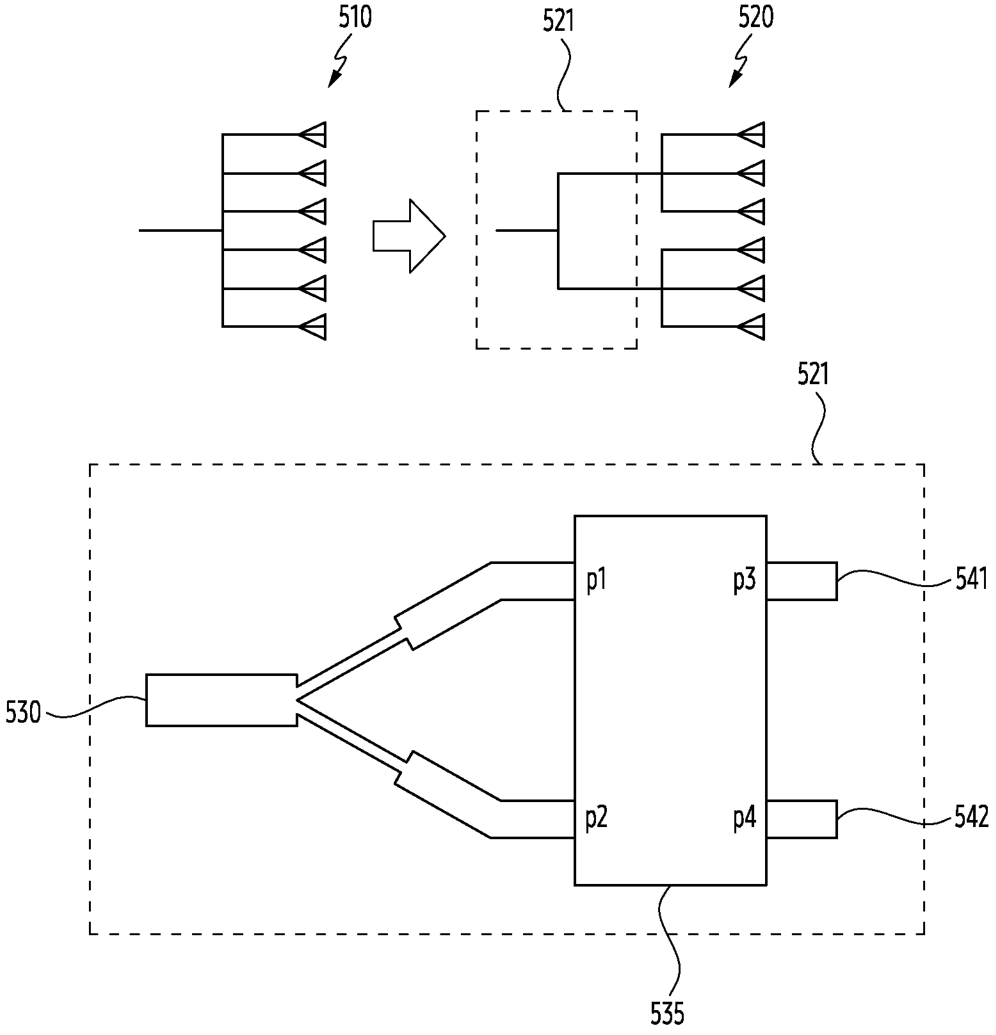
FIG. 5 illustrates an example of an arrangement of a 4-port phase shifter according to an embodiment of the disclosure.

FIG. 5 illustrates an example of a deployment of a 4-port phase shifter according to an embodiment of the disclosure. The 4-port phase shifter includes two input ports and two output ports. To describe the deployment of the 4-port phase shifter, a sub-array inclusive of 6 antenna elements is described as an example.

Referring to FIG. 5, the sub-array of a first array 510 may include 6 antenna elements. The six antenna elements may be implemented as a sub-array of a second array 520 through a power divider 521. According to an embodiment, the power divider 521 may be a two-way divider. The power divider 521 may include a first transmission branch and a second transmission branch. Three antenna elements may be connected to each transmission branch. According to an embodiment, the power divider 521 may be made of a metal material. For example, the power divider is implemented as a conductive pattern (e.g., copper pattern) on a printed circuit board (PCB).

The power divider 521 may include one input terminal 530 and two output terminals 541 and 542. The power divider 521 may include a first output terminal 541 for a first transmission branch of the power divider 521 and a second output terminal 542 for a second transmission branch of the power divider 521. Dielectrics may be disposed flexibly. Such a flexible deployment of the dielectric may change the effective permittivity (or equivalent permittivity) of the first transmission branch caused by a distance proximate to the first transmission branch. The flexible deployment of the dielectric may change the effective permittivity of the second transmission branch caused by a distance proximate to the second transmission branch. The dielectrics may be disposed flexibly. According to an embodiment, the dielectric may be disposed according to a rotational movement. According to an embodiment, the dielectric may be disposed according to a linear movement. According to an embodiment, the dielectric may be disposed according to a helical movement. According to an embodiment, the dielectric may move in a zigzag pattern.

The dielectric may be located above a certain transmission line (e.g., a first transmission branch or a second transmission branch) according to the movement. For example, the dielectric is located above the transmission line between a branch point of the power divider 521 and the first output terminal 541. For example, the dielectric is located above the transmission line between the branch point of the power divider 521 and the second output terminal 542. Based on the location of the dielectric, the first transmission branch may include a first input p1 and a first output p3. Based on the deployment of the dielectric, the second transmission branch may include a second input p2 and a second output p4.

Assume the arrangement of a 2-port phase shifter for the input and output of each transmission branch. The 2-port phase shifter may be disposed between each transmission branch and antenna elements. However, since the output of the 2-port phase shifter has to provide a phase difference of 0 to 180 degrees, it will be difficult for a manufacturer to design such a 2-port phase shifter. As another example, suppose a deployment of a 3-port phase shifter using the input terminal 530 as an input port and the output terminals 541 and 542 as output ports. However, it would likewise be difficult to arrange such a 3-port phase shifter because the 3-port phase shifter has to be disposed to include the transmission branch point.

In order to solve the above-mentioned problems, the embodiments of the disclosure propose a 4-port phase shifter 535 using both inputs and outputs of the transmission branch. Such a 4-port phase shifter 535 provides phase shifting between the transmission branches. Due to a relatively low amount of phase provision of the 4-port phase shifter 535, the design of the 4-port phase shifter 535 may be relatively easy compared to other phase shifters (e.g., 2-port phase shifter or 3-port phase shifter). In addition, it is not necessary to essentially include a branch point like the 3-port phase shifter, so it has a high degree of freedom in deployment. Due to the high degree of freedom of the 4-port phase shifter 535, it may lead to flexible arrangement or simplified configuration of dielectrics. Wherever four ports including two inputs (p1, p2) and two outputs (p3, p4) are formed, it is possible to dispose the 4-port phase shifter 535.

Figure 6A:
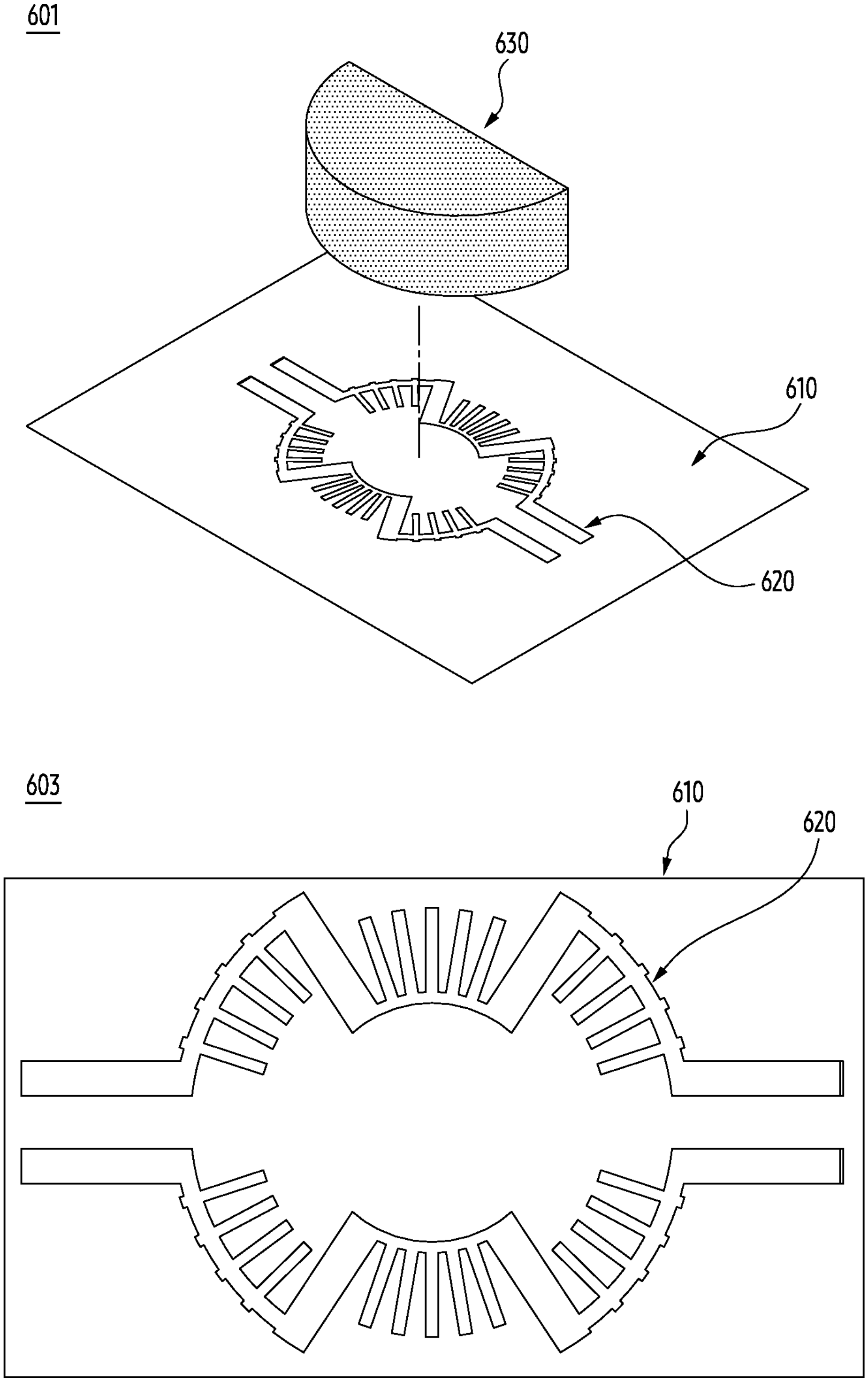
FIGS. 6A and 6B illustrate examples of a phase shifter using rotation of a dielectric according to embodiments of the disclosure.
Figure 6B:
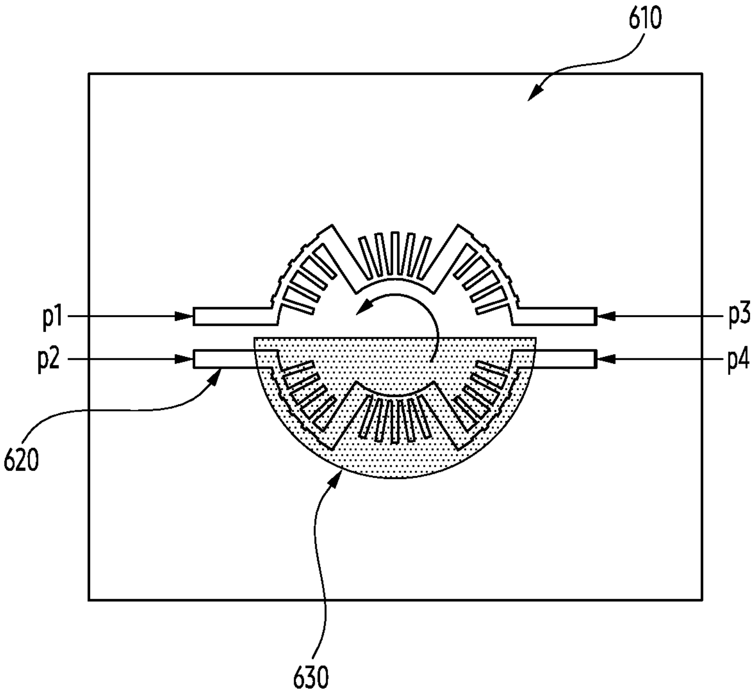

FIGS. 6A and 6B illustrate examples of a phase shifter using rotation of a dielectric according to embodiments of the disclosure. The phase shifter may include a transmission line and a dielectric material.

Referring to FIG. 6A, a perspective view 6θ1 is a view of the phase shifter viewed from the upper side using a dielectric material. The phase shifter using a dielectric may include a transmission pattern 620 and a dielectric 630. A plan view 603 is a view of the transmission pattern 620 viewed from the above. The transmission pattern 620 may be disposed on a PCB 610. According to an embodiment, the transmission pattern 620 may be made of a metal material. For example, the metal material may include copper. The transmission pattern 620 may be plated on one surface of the PCB 610. The transmission pattern 620 may include two transmission lines.

The transmission pattern 620 may include a structure between an input of a first transmission line and an output of the first transmission line. The transmission pattern 620 may include a structure between an input of a second transmission line and an output of the second transmission line. According to an embodiment, the structure may include a bending structure. The bending structure refers to a structure in which at least part of the transmission line is bent. For example, the structure includes a helical transmission line. For example, the structure includes a folded-back transmission line. For example, the structure includes a zigzag transmission line. According to an embodiment, the structure may include a slow-wave transmission line. For adjusting the permittivity, the structure may include one or more lines. For example, the line structure includes an open stub. For example, the line structure includes stubs that form a comb shape and are periodically disposed.

Referring to FIG. 6B, the 4-port phase shifter may include a transmission pattern 620 and a dielectric 630. The transmission pattern 620 is formed on the PCB 610. The transmission pattern 620 may include a first transmission branch having a first input p1 and a first output p3. The transmission pattern 620 may include a second transmission branch having a second input p2 and a second output p4.

According to an embodiment, the dielectric 630 may rotate. As the dielectric 630 rotates, an overlapping region of the transmission pattern 620 and the dielectric 630 may change. According to the rotation of the dielectric 630, the effective permittivity (or equivalent permittivity) of the first transmission branch varies. In various states according to the rotation of the dielectric 630, the first transmission branch may provide various amounts of phase change. Depending on the rotation of the dielectric 630, the effective permittivity of the second transmission branch varies. In various states according to the rotation of the dielectric 630, the second transmission branch may provide various amounts of phase change.

According to the rotation of the dielectric 630, the effective permittivity of the first transmission branch and the effective permittivity of the second transmission branch may vary altogether. That is, the 4-pot phase shifter may change the phases of both the first transmission branch and the second transmission branch, with rotation of one dielectric 630. According to the rotation of the dielectric 630, the distance between the dielectric and the first transmission branch is changed. According to the rotation of the dielectric 630, the distance between the dielectric and the second transmission branch is changed. When the distance between the transmission branch and the dielectric is different, the effective permittivity is also different. For example, when the dielectric 630 gets closer to the first transmission branch, the effective permittivity of the first transmission branch increases. For example, when the dielectric 630 gets closer to the second transmission branch, the effective permittivity of the second transmission branch increases. As the dielectric 630 moves, the dielectric 630 may be repeatedly moved toward and away from the first transmission branch. As the dielectric 630 rotates, the dielectric 630 may be repeatedly moved toward and away from the second transmission branch. The phase shifter using a dielectric may change the phase, based on the effective permittivity of a transmission line.

Although the phase shifter using rotation has been described referring to FIGS. 6A and 6B, embodiments of the disclosure are not limited thereto. According to an embodiment, the effective permittivity of the transmission branch may be changed according to a linear movement of the dielectric. According to another embodiment, the dielectric may change the effective permittivity of the transmission branch while moving along a designated path.

Figure 7:
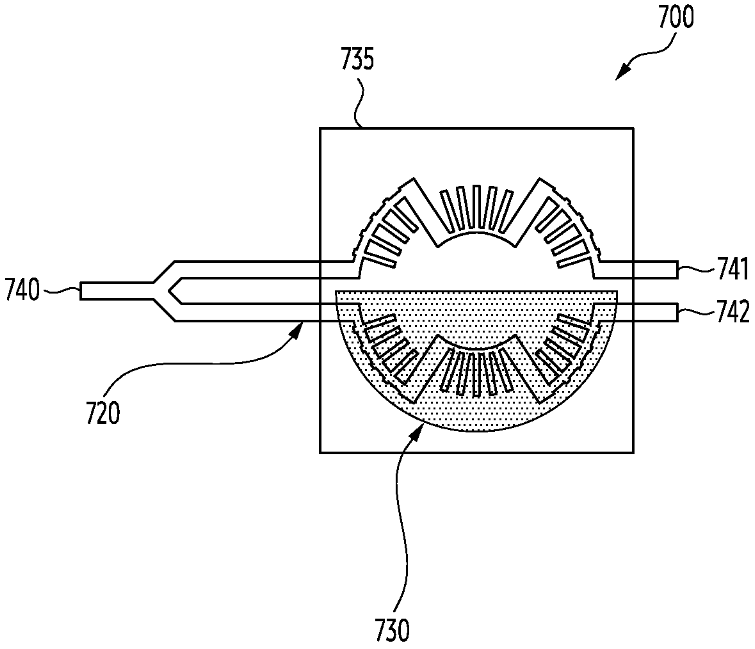
FIG. 7 illustrates an example of deployment of a metal pattern and a dielectric of a phase shifter according to an embodiment of the disclosure.

FIG. 7 illustrates an example of deployment of a metal pattern and a dielectric of a phase shifter according to an embodiment of the disclosure. The phase shifter 700 may utilize rotation of the dielectric over a transmission pattern including a two-way divider. The transmission pattern may be made of metal. The transmission pattern may be referred to as a metal pattern. Although FIG. 7 illustrates a structure in which a cross-section of a dielectric is semicircular as a shape of the dielectric, the embodiments of the disclosure are not limited thereto. FIG. 7 illustrates a structure having a semi-circular cross-section as the shape of the dielectric, the embodiments of the disclosure are not limited thereto. Various shapes such as e.g., a rectangular parallelepiped, a cylinder, a sphere, a three-dimensional shape having a curved surface, or the like may be used as the dielectrics to change the effective permittivity (or equivalent permittivity) of a transmission line.

Referring to FIG. 7, the phase shifter 700 may include a metal pattern 720 and a dielectric 730. The metal pattern 720 may include a power divider. The power divider may be a two-way divider. A two-way divider may include one input 740 and two output terminals 741 and 742. The two-way divider may have a first transmission branch and a second transmission branch. The two output terminals 741 and 742 may include a first output terminal 741 for a first transmission branch and a second output terminal 742 for a second transmission branch. The phase shifter 700 may be a 4-port phase shifter 735. For implementation of such a 4-port phase shifter 735, a deployed region of the dielectric 730 may be located in between two transmission branches of the metal pattern 720. For example, the dielectric 730 overlaps the branching point of the transmission branches and the output terminal of the first transmission branch. As another example, the dielectric 730 may overlap the branching point of the transmission branches and the output end of the second transmission branch. Due to the rotation of the dielectric 730, the dielectric environment around the transmission line of the metal pattern 720 may vary. This is because the effective permittivity changes as the distance between the transmission line and the dielectric 730 changes. Hereinafter, description is made of the phase difference in the output terminals (e.g., the first output terminal 741 and the second output terminal 742) according to the position of the dielectric 730 in FIG. 8.

Figure 8:
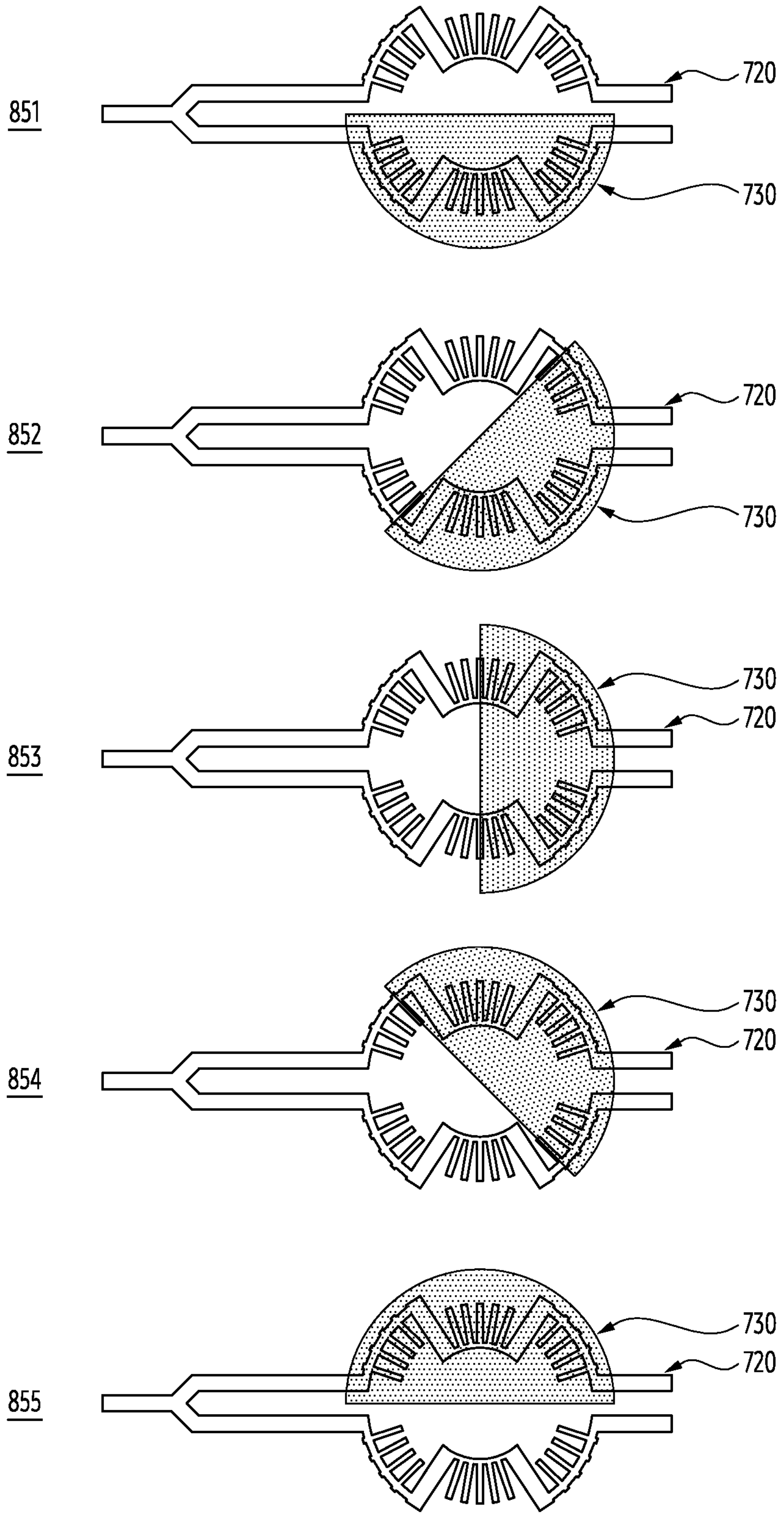
FIG. 8 illustrates examples of change in phase according to rotation of a dielectric according to an embodiment of the disclosure.

FIG. 8 illustrates examples of change in phase according to rotation of a dielectric according to an embodiment of the disclosure. To better explain the phase difference for each state of the dielectric, the 4-port phase shifter 735 of FIG. 7 will be described as an example, hereinafter.

Referring now to FIG. 8, in a first state 851, the position of the dielectric 730 may correspond to a reference position. For example, the reference position may refer to a position where the effective permittivity (or equivalent permittivity) of the second transmission branch is formed in the highest. A rotation angle of the dielectric 730 at the reference position may be substantially 0 degrees. A rotation axis of the dielectric 730 may be positioned in between the first transmission branch and the second transmission branch of the metal pattern 720. Since the dielectric and the first transmission branch do not overlap each other and the dielectric and the second transmission branch do overlap each other, the effective permittivity of the first transmission branch and the effective permittivity of the second transmission branch may be different from each other. At the input terminal of the two-way divider, the same input signal may pass through the transmission branches providing different phase shifting. Accordingly, the phase of the output of the first transmission branch may be different from the phase of the output of the second transmission branch. In the first state 851, the phase of the second transmission branch may be greater than the phase of the first transmission branch. In the first state 851, the phase difference between the phase of the second transmission branch and the first transmission branch may be greater than that in any other states.

In a second state 852, the rotation angle of the dielectric 730 may be greater than 0 degrees and less than 90 degrees in a clockwise direction from the reference position. The rotation axis of the dielectric 730 may be positioned in between the first transmission branch and the second transmission branch of the metal pattern 720. A first region where the dielectric and the first transmission branch overlap may be smaller than the second region where the dielectric and the second transmission branch overlap. As illustrated in FIG. 8, as the dielectric moves or rotates from the first state 851 to the second state 852, a first region where the dielectric overlaps the first structure shrinks and a second region where the dielectric overlaps the second structure expands. Further, as the dielectric moves or rotates from the second state 852 to the first state 851, the first region where the dielectric overlaps the first structure expands and the second region where the dielectric overlaps the second structure shrinks. The effective permittivity of the second transmission branch may be greater than that of the first transmission branch. At the input terminal of the two-way divider, the same input signal may pass through the transmission branches providing different phase shifting. Accordingly, the phase of the output of the second transmission branch may be greater than the phase of the output of the first transmission branch.

In a third state 853, the rotation angle of the dielectric 730 may be substantially 90 degrees clockwise from the reference position. The rotation axis of the dielectric 730 may be positioned in between the first transmission branch and the second transmission branch of the metal pattern 720. The first region where the dielectric and the first transmission branch overlap may be the same as a second region where the dielectric and the second transmission branch overlap. The effective permittivity of the second transmission branch and the permittivity of the first transmission branch may be the same. At the input terminal of the two-way divider, the same input signal may pass through the transmission branches providing the same phase shifting. Thus, the phase of the output of the second transmission branch may be the same as the phase of the output of the first transmission branch.

In a fourth state 854, the rotation angle of the dielectric 730 may be greater than 90 degrees and less than 180 degrees clockwise from the reference position. The rotation axis of the dielectric 730 may be positioned in between the first transmission branch and the second transmission branch of the metal pattern 720. The first region where the dielectric and the first transmission branch overlap may be larger than the second region where the dielectric and the second transmission branch overlap. The effective permittivity of the first transmission branch may be greater than that of the second transmission branch. At the input terminal of the two-way divider, the same input signal may pass through the transmission branches providing different phase shifting. Thus, the phase of the output of the first transmission branch may be greater than the phase of the output of the second transmission branch.

In a fifth state 855, the rotation angle of the dielectric 730 may be less than 180 degrees clockwise from the reference position. The rotation axis of the dielectric 730 may be positioned in between the first transmission branch and the second transmission branch of the metal pattern 720. Since the dielectric and the second transmission branch do not overlap and the dielectric and the first transmission branch do overlap, the permittivity of the first transmission branch and the effective permittivity of the second transmission branch may be different from each other. At the input terminal of the two-way divider, the same input signal may pass through the transmission branches providing different phase shifting. Thus, the phase of the output of the first transmission branch may be greater than the phase of the output of the second transmission branch.

Although in FIG. 8, those five states according to the position of the dielectric 730 are illustrated, the embodiments of the disclosure are not limited thereto, and more than five states may be further defined as occasions require.

Although FIG. 8 illustrates an example in which the dielectric 730 rotates from 0 degrees to 180 degrees, the embodiments of the disclosure are not limited thereto. According to an embodiment, the rotation angle of the dielectric 730 may rotate from 0 degree to −180 degrees, that is, in a counterclockwise direction. According to another embodiment, the rotation angle of the dielectric 730 may be in a range of 0 degree to 360 degrees. If the components of the transmission lines are uniform, the state providing the same phase difference may exist at least two times in one rotation period. In addition to the examples described above, the phases of the output terminals of the 4-port may be adjusted by changing the equivalent permittivity environment of the first transmission branch and the equivalent permittivity environment of the second transmission branch by means of rotation of the dielectric 730 within a designated range.

Figure 9:
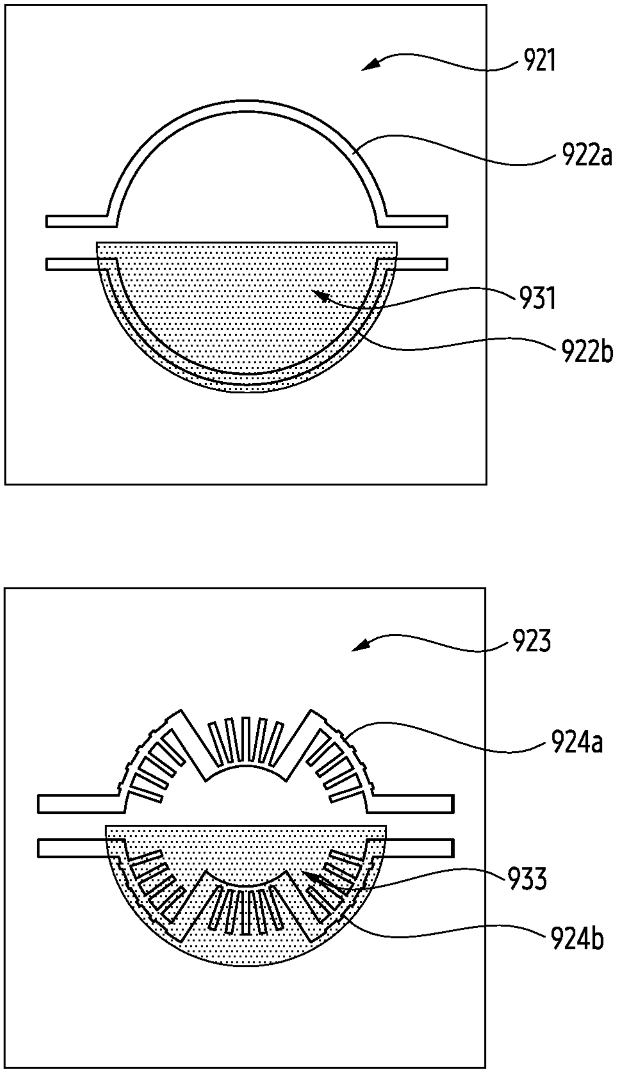
FIG. 9 illustrates examples of a metal pattern of a phase shifter according to an embodiment of the disclosure.

FIG. 9 illustrates examples of metal patterns of a phase shifter according to an embodiment of the disclosure. Referring to FIG. 9, a slow-wave technique for increasing its electrical length using a fixed physical length is described.

Referring to FIG. 9, the metal pattern 921 of the phase shifter may include two transmission branches 922*a* and 922*b* of the two-way divider. The two transmission branches may include a first transmission branch 922*a* and a second transmission branch 922*b*. According to an embodiment, the first transmission branch 922*a* may include a bending structure forming a semicircle. According to an embodiment, the second transmission branch 922*b* may also include a bending structure forming a semicircle. For example, the radius of the semicircle is about 14 mm (millimeter). The distance from one end of the bending structure to its rotation axis may be about 14 mm. The area of the dielectric 931 for changing the effective permittivity may be related to the area of the metal pattern 921 of the phase shifter. The phase shifter having the metal pattern 921 and the dielectric 931 simply forming a semicircle may be disadvantageous to the production of an antenna module with multiple RF paths due to its large area. Therefore, the slow-wave technique may be applied to the metal pattern.

The metal pattern 923 of the phase shifter may include two transmission branches 924*a* and 24*b* of the two-way divider. The two transmission branches may include a first transmission branch 924*a* and a second transmission branch 924*b*. The first transmission branch 924*a* may include a transmission line of a bending structure with a plurality of segmentation points in order to reduce the area of the phase shifter. The segmentation point may refer to a point at which the progressing direction of the transmission line is changed by a certain angle or more. For example, the first transmission branch 924*a* includes a transmission line having an 'M'-shaped bending structure as shown in FIG. 9. According to an embodiment, the first transmission branch 924*a* may include a bending structure corresponding to the slow-wave technique. The first transmission branch 924*a* may further include one or more stubs. The first transmission branch 924*a* may have a periodic structure. The stubs may be arranged periodically. The second transmission branch 924*b* may include a transmission line of a bending structure with a plurality of segmentation points in order to reduce the area of the phase shifter. For example, the second transmission branch 924*b* include a transmission line having a 'W'-shaped bending structure as shown in FIG. 9. According to an embodiment, the second transmission branch 924*b* may have a bending structure corresponding to the slow-wave technique. The second transmission branch 924*b* may further include one or more stubs. The second transmission branch 924*b* may include a periodic structure. The stubs may be arranged periodically.

The slow-wave technique may have the design of a transmission line configured so that a wave travels at a phase velocity less than or equal to a predetermined propagation speed. For example, a transmission line with periodic parallel capacitors may provide a relatively slow phase velocity, compared to other transmission lines that do not have such. This is because the addition of the parallel capacitor increases the effective capacitances of the entire transmission line. The phase velocity may refer to a physical length per unit phase variation. That is to say, the characteristics of a transmission line with a small phase velocity may provide a reduced dimension of a circuit. As shown in FIG. 9, periodic stubs may be coupled to the transmission line. One or more stubs may be arranged in parallel. That is, each stub may be a shunt stub. For example, the shunt stub is disposed to face a side direction of the progressing direction (e.g., a direction substantially perpendicular to the direction of progress). For example, the shunt stub is an open stub. As another example, the stub is a short stub. Due to the arrangement of the shunt stubs, the effective capacitance (C) or the effective inductance (L) of the transmission line may be improved. Referring to the Equation 2 above, as the L or C component increases, the metal pattern 923 may provide a larger amount of phase variation to the transmission branch even if the physical length (l) is the same. Likewise, the physical length required to provide the same phase difference to the transmission branch may be reduced. For example, the distance between one end of the bending structure of the metal pattern 923 and its rotation axis is about 7 mm. Using such a periodic structure of the transmission line, its dedicated area for the phase shifter may be reduced by about 50%. The area of the dielectric 933 for changing the effective permittivity may be related to the area of the metal pattern 923 of the phase shifter. Through the metal pattern 923 of the phase shifter, the area of the dielectric 933 may be reduced compared to the dielectric 931.

Figure 10:
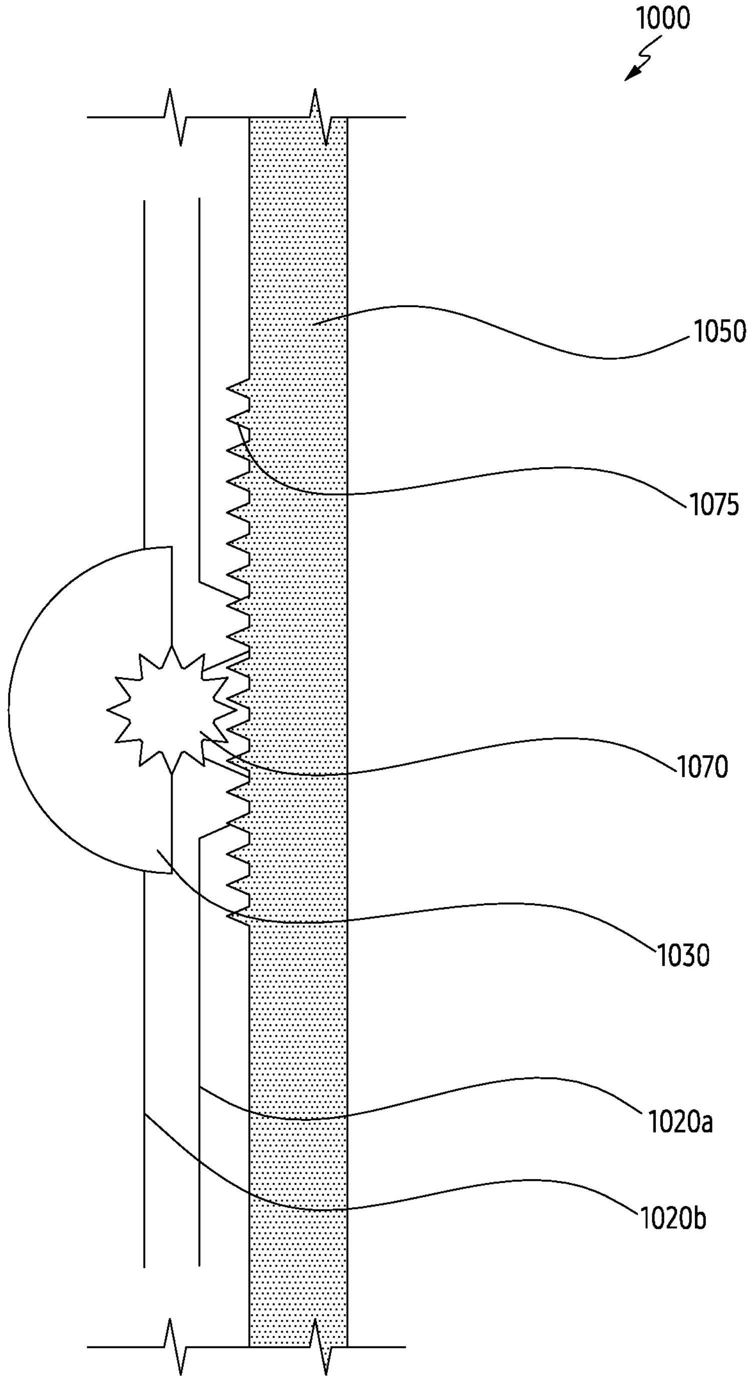
FIG. 10 illustrates an example of a phase shifter module according to an embodiment of the disclosure.

FIG. 10 illustrates an example of a phase shifter module according to an embodiment of the disclosure. Referring to FIG. 10, the phase shifter in which dielectrics rotate in response to linear movement of a moving plate is described. However, a coupling structure of the phase shifter and the moving plate of FIG. 10 is only an example for explaining the operating principle of the phase shifter and is not construed as limiting other embodiments of the disclosure thereto.

Referring to FIG. 10, a plan view 1000 is a view of the phase shifter module viewed from above.

The phase shifter module may be disposed on a PCB. The PCB 1010 may include metal patterns 1020*a* and 1020*b*. The PCB 1010 may include a first metal pattern 1020*a* and a second metal pattern 1020*b*. The first metal pattern 1020*a* may be configured to supply an RF signal supplied from a port to antenna elements. The second metal pattern 1020*b* may be configured to supply the RF signal supplied from the port to the antenna elements.

A dielectric 1030 may be disposed above the PCB 1010. The dielectric 1030 may be disposed to overlap a designated region of the first metal pattern 1020*a*. For example, the dielectric 1030 is in contact with the first metal pattern 1020*a* in the designated region. As shown in FIG. 9, the designated region may be a location where a transmission line including a slot-wave structure is formed (e.g., the 'M'-shaped bending structure in FIG. 9). At least a portion of the dielectric 1030 may overlap the designated region of the first metal pattern 1020*a*.

Likewise, the dielectric 1030 may be disposed to overlap a designated region of the second metal pattern 1020*b*. For example, the dielectric 1030 is in contact with the second metal pattern 1020*b* in the designated region. As shown in FIG. 9, the designated region may be a location where a transmission line including the slot-wave structure is formed (e.g., the 'W'-shaped bending structure in FIG. 9). At least a portion of the dielectric 1030 may overlap the designated region of the second metal pattern 1020*b*.

According to an embodiment, the dielectric 1030 may rotate. For rotation of dielectric 1030, the dielectric 1030 may be coupled with a gear 1070.

A moving member 1050 may be formed along the extending directions of the first metal pattern 1020*a* and the second metal pattern 1020*b*. For example, the moving member 1050 has a plate shape. The moving member 1050 may be also referred to as a moving plate. A rack 1075 may be disposed at its connecting part. According to an embodiment, the moving member 1050 may make a linear movement. According to the linear movement of the movable member 1050, at least part of the movable member 1050 may be drawn out or drawn into a groove of a fixing member.

According to the linear movement of the moving member 1050, the connecting portion and the rack 1075 may linearly move together. According to an embodiment, the linear movement of the moving member 1050 may cause rotating movement of each dielectric. A rack and pinion gear is a mechanical component for converting a rotating movement into a linear movement or converting the linear movement into the rotating movement, when their two axes are arranged in parallel. According to an embodiment, the gear 1070 may be a pinion gear. The gear 1070 may be coupled with the rack 1075.

In the above-described embodiments, the phase shifter having a semicircular dielectric and an 'M'-shaped or 'W'-shaped metal pattern has been described as an example, but the embodiments of the disclosure are not limited thereto. Even if it has a different shape from the examples shown in FIGS. 6A, 6B, 7, 8, 9 to 10, the 4-port phase shifter formed based on the phase shifters flexibly disposed in between the two transmission branches of the metal pattern may be understood as one embodiment of the disclosure. Hereinafter, various examples of the shape of the metal pattern are described in FIG. 11A. Further, various examples of the shape of the dielectric are described in FIG. 11B.

Figure 11A:
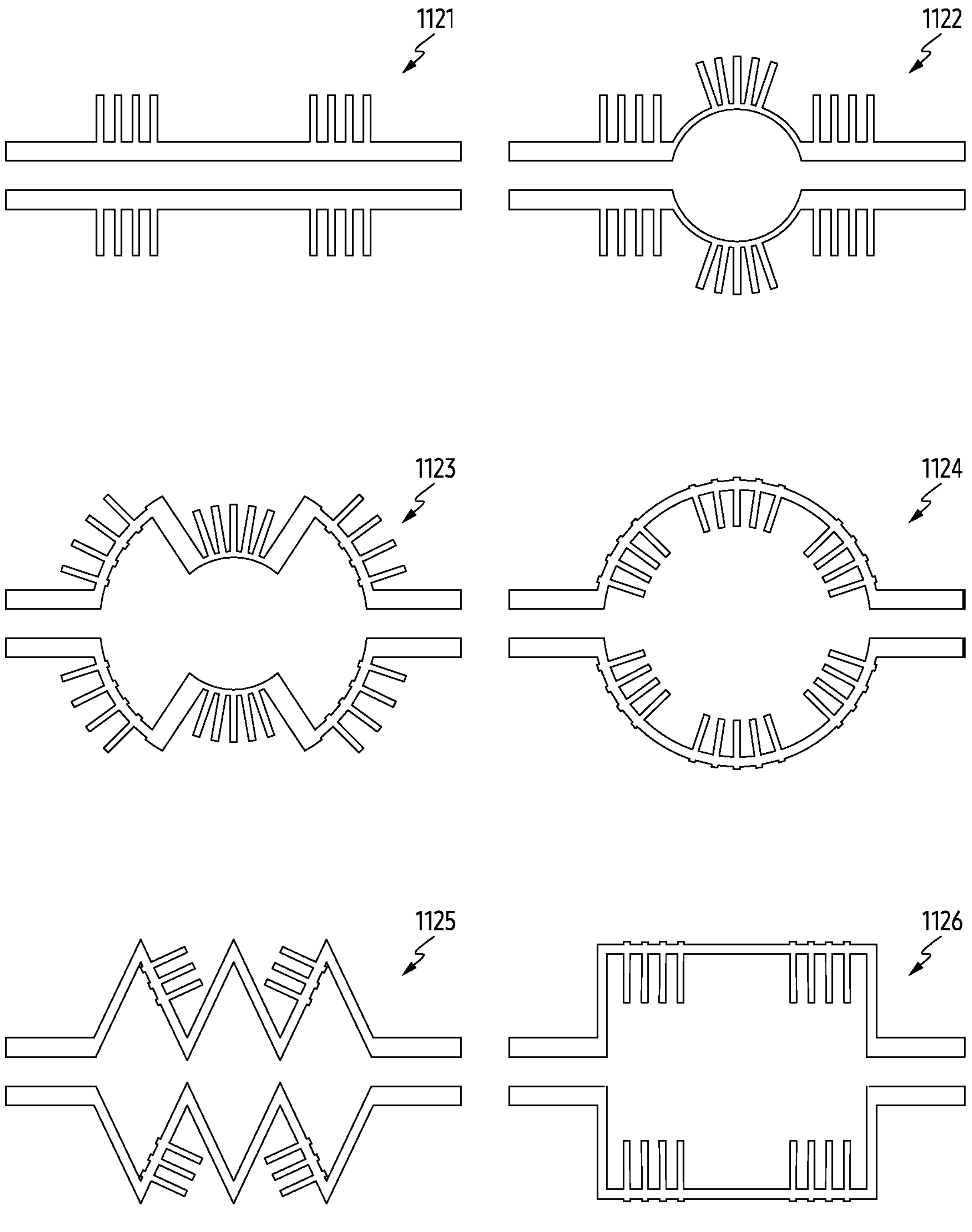
FIG. 11A illustrates examples of a shape of a metal pattern according to an embodiment of the disclosure.

FIG. 11A illustrates examples of various shapes of a metal pattern according to an embodiment of the disclosure. The shapes of the metal pattern shown in FIG. 11A are exemplary. In addition to the shapes described below, the shape of the metal pattern to which the same technical principle is applied may be used for the 4-port phase shifter of the disclosure.

Referring to FIG. 11A, each transmission branch of a first metal pattern 1121 may include a transmission line and a plurality of shunt stubs coupled to the transmission line. The stubs disposed perpendicular to the transmission line may increase the effective capacitance. Increased effective capacitance may reduce the required length per unit phase variation amount. That is, the first metal pattern 1121 may provide a slow-wave effect compared to a conventional unidirectional transmission line.

Each transmission branch of a second metal pattern 1122 may include a transmission line with its partial curved section, and may include a plurality of shunt stubs coupled to the transmission line. The shunt stubs may be disposed in a curved section as well as in a straight section of the transmission line.

A third metal pattern 1123 may include a transmission branch with an 'M'-shaped transmission line and a transmission branch with a 'W'-shaped transmission line, as in the metal pattern 720 of FIG. 7. Further, the third metal pattern 1123 may include a plurality of shunt stubs. In this connection, each shunt stub may be disposed in both directions at one point.

Each transmission branch of a fourth metal pattern 1124 may include a semicircular transmission line. Each transmission branch of the fourth metal pattern 1124 may include a plurality of shunt stubs coupled to the semicircular transmission line. In this connection, the shunt stubs may be arranged in one direction (e.g., either the left or the right of the transmission direction). For example, each shunt stub of the transmission branch is arranged so as to face the axis of rotation. For the first transmission branch where an RF signal is transmitted from left to right (e.g., the upper transmission branch in FIG. 11A), each shunt stub may be arranged in the right-side direction of the transmission. For the second transmission branch where the RF signal is transmitted from left to right (e.g., the lower transmission branch in FIG. 11A), each shunt stub may be arranged in the left-side direction of the transmission.

A fifth metal pattern 1125 may include a zigzag type of transmission line. Each transmission branch of the fifth metal pattern 1125 may include a plurality of shunt stubs coupled to the zigzag type of transmission line. The stubs disposed perpendicular to the transmission line may increase the effective capacitance.

A sixth metal pattern 1126 may include a pulse type of transmission line. Each transmission branch of the sixth metal pattern 1126 may include a plurality of shunt stubs coupled to the pulse type of transmission line. The shunt stubs may be arranged in one direction (e.g., either to the left or to the right of the transmission direction). For example, each shunt stub of the transmission branch is disposed so as to face the axis of rotation. For the first transmission branch where the RF signal is transmitted from left to right (e.g., the upper transmission branch in FIG. 11A), each shunt stub may be arranged in the right-side direction of the transmission. For the second transmission branch where the RF signal is transmitted from left to right (e.g., the lower transmission branch in FIG. 11A), each shunt stub may be arranged in the left-side direction of the transmission.

Although FIG. 11A illustrates the shape of the first transmission branch and the shape of the second transmission branch symmetrically with respect to a straight line, but the embodiments of the disclosure are not necessarily limited thereto. According to an embodiment, the shape of the first transmission branch and the shape of the second transmission branch may be different from each other. Further, according to an embodiment, the shape of the first transmission branch and the shape of the second transmission branch may not be symmetrical to each other.

Figure 11B:
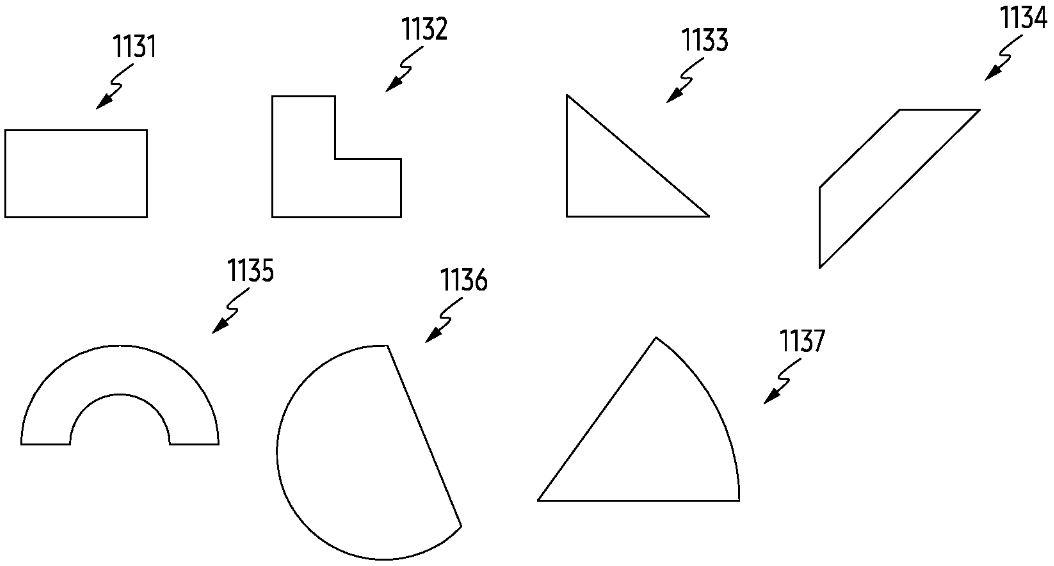
FIG. 11B illustrates examples of a shape of a dielectric according to an embodiment of the disclosure.

FIG. 11B illustrates examples of various shapes of a dielectric according to an embodiment of the disclosure. The shapes of the dielectric shown in FIG. 11B are only of an example. In addition to the shapes described below, any shape of a dielectric shape to which the same technical principle is applied may be used for the 4-port phase shifter of the disclosure.

Referring to FIG. 11B, the shape of a first dielectric 1131 may include a rectangular cross-section. As described with reference to FIGS. 6A, 6B, 7, 8, 9 to 10, as the first dielectric 1131 moves (e.g., rotates) across the first transmission branch and the second transmission branch of the metal pattern, an overlapping area of the rectangular cross-section and the metal pattern may vary. Depending on the position of the rectangular cross-section, the magnitude of the phase shifting provided by the transmission branch varies.

The shape of a second dielectric 1132 may include a polygonal cross-section. As described with reference to FIGS. 6A, 6B, 7, 8, 9 to 10, as the second dielectric 1132 moves (e.g., rotates) across the first transmission branch and the second transmission branch of the metal pattern, an overlapping area of the polygonal cross-section and the metal pattern may vary. Depending on the position of the polygon cross-section, the magnitude of the phase shifting provided by the transmission branch varies.

The shape of a third dielectric 1133 may have a triangular cross-section. As described with reference to FIGS. 6A, 6B, 7, 8, 9 to 10, as the third dielectric 1133 moves (e.g., rotates) across the first transmission branch and the second transmission branch of the metal pattern, an overlapping area of the triangular cross-section and the metal pattern may vary. Depending on the position of the triangular cross-section, the magnitude of the phase shifting provided by the transmission branch varies.

The shape of a fourth dielectric 1134 may have a polygonal cross-section. For example, the polygonal cross-section is a cross-section obtained by truncating a portion from a triangle. As described with reference to FIGS. 6A, 6B, 7, 8, 9 to 10, as the polygonal structure of the fourth dielectric 1134 moves (e.g., rotates) across the first transmission branch and the second transmission branch of the metal pattern, an overlapping area of the polygonal cross-section and a metal pattern may vary. Depending on the position of the polygon cross-section, the magnitude of the phase shifting provided by the transmission branch varies.

The shape of a fifth dielectric 1135 may have a truncated semicircular cross-section. As described with reference to FIGS. 6A, 6B, 7, 8, 9 to 10, as the fifth dielectric 1135 moves (e.g., rotates) across the first transmission branch and the second transmission branch of the metal pattern, its overlapping area may vary. Depending on the position of the cross-section of the truncated semicircle, the magnitude of the phase shifting provided by the transmission branch varies.

The shape of a sixth dielectric 1136 may have a cross-section in which part of a circle is truncated. As described with reference to FIGS. 6A, 6B, 7, 8, 9 to 10, its overlapping area may vary as the sixth dielectric 1136 moves (e.g., rotates) across the first transmission branch and the second transmission branch of the metal pattern.

The shape of a seventh dielectric 1137 may have a fan-shaped cross-section. As described with reference to FIGS. 6A, 6B, 7, 8, 9 to 10, its overlapping area may vary as the seventh dielectric 1137 moves (e.g., rotates) across the first transmission branch and the second transmission branch of the metal pattern.

Figure 12:
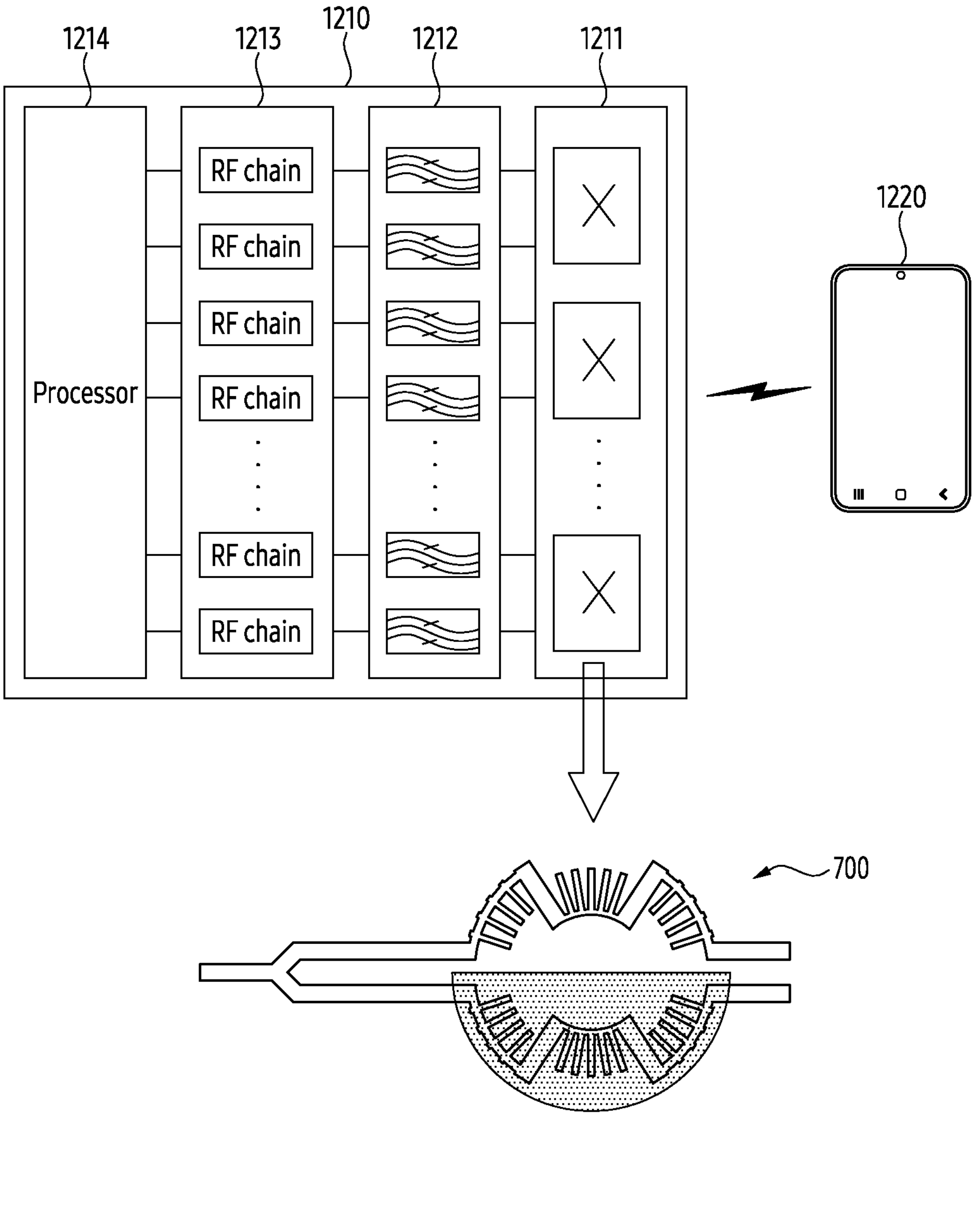
FIG. 12 illustrates a functional configuration of an electronic device including a phase shifter according to an embodiment of the disclosure.

FIG. 12 illustrates a functional configuration of an electronic device 1210 including a phase shifter according to an embodiment of the disclosure. The electronic device 1210 may be a base station 110 of FIG. 1 or an MMU of the base station 110. Meanwhile, differently from the illustration, the electronic device 1210 of the disclosure may be implemented in a terminal 120 of FIG. 1. The embodiments of the disclosure encompass not only the arrangement structure of the phase shifter described with reference to FIGS. 1, 2A, 2B, 3, 4A, 4B, 5, 6A, 6B, 7, 8, 9 to 10, but also the electronic device including the same. The electronic device 1110 may include a phase shifter using movement of a feeder line and a dielectric in a PCB.

Referring to FIG. 12, a functional configuration of an electronic device 1210 is illustrated. The electronic device 1210 may include an antenna module 1211, a filter module 1212, a radio frequency (RF) processor 1213, and a controller 1214.

The antenna module 1211 may include a plurality of antennas. The antenna performs the function for transmitting and receiving signals through a radio channel. The antenna may include a radiator made of a conductor or a conductive pattern formed on a substrate (e.g., PCB). The antenna may radiate an up-converted signal on the radio channel or obtain a signal radiated by another device. Each antenna may be referred to as an antenna element or antenna device. In some embodiments, the antenna module 1211 may include an antenna array in which a plurality of antenna elements form an array. The antenna module 1211 may be electrically connected to the filter module 1212 through RF signal lines.

The antenna module 1211 may be mounted on a PCB including a plurality of antenna elements. The PCB may include a plurality of RF signal lines connecting each antenna element and each filter of the filter module 1212. These RF signal lines may be referred to as a feeding network.

The antenna module 1211 may provide the received signal to the filter module 1212 or may radiate the signal provided from the filter module 1212 into the air. The antenna module 1211 according to embodiments of the disclosure may include a phase shifter using dielectric movement (e.g., rotational movement). As described with reference to FIGS. 1, 2A, 2B, 3, 4A, 4B, 5, 6A, 6B, 7, 8, 9, to 10, 11A and 11B, the phase shifter using the dielectric movement may include two transmission lines whose permittivity varies according to the movement of the dielectric.

Although FIG. 12 illustrates the phase shifter 700 of FIG. 7 as a phase shifter, the embodiments of the disclosure are not limited thereto. The following descriptions may be applied not only to the shape of the phase shifter 700 of FIG. 7, but also to the shape of the phase shifter having the dielectric and the transmission lines whose permittivity varies according to the movement of the dielectric (e.g., various shapes of metal patterns, such as metal patterns like the first metal pattern 1121, the second metal pattern 1122, the third metal pattern 1123, the fourth metal pattern 1124, the fifth metal pattern 1125, or the sixth metal pattern 1126 of FIG. 11A, and/or various shapes of dielectric such as dielectrics like the first dielectric 1131, the second dielectric 1132, the third dielectric 1133, the fourth dielectric 1134, the fifth dielectric 1135, the sixth dielectric 1136 or the seventh dielectric 1137 of FIG. 11B).

The filter module 1212 performs filtering to transmit a desired frequency of signal. The filter module 1212 may perform a function of selectively identifying a certain frequency by forming resonance. The filter module 1212 may include at least one of a band-pass filter, a low-pass filter, a high-pass filter, or a band-reject filter. In other word, the filter module 1212 may include RF circuits to obtain signals of a frequency band for transmission or a frequency band for reception. The filter module 1212 according to various embodiments may electrically connect the antenna module 1211 and the RF processor 1213.

The RF processor 1213 may include a plurality of RF paths. An RF path may be a unit of a path through which a signal received through an antenna or a signal radiated through an antenna is transmitted. At least one RF path may be referred to as an RF chain. An RF chain may include a plurality of RF elements. The RF elements includes amplifiers, mixers, oscillators, DACs, ADCs, and so on. For example, the RF processor 1213 may include an up-converter for up-converting a baseband digital transmit signal to a transmit frequency, and a digital-to-analog converter (DAC) for converting the up-converted digital transmit signal into an analog RF transmit signal. The up-converter and the DAC form part of the transmission path. The transmission path may further include a power amplifier (PA) or a coupler (or combiner). Further, for example, the RF processor 1213 includes an analog-to-digital converter (ADC) that converts an analog RF receive signal into a digital receive signal and a down-converter that down-converts the digital receive signal into a baseband digital receive signal. The ADC and the down-converter form part of the receive path. The receive path may further include a low-noise amplifier (LNA) or a coupler (or divider). RF components of the RF processor may be implemented on a PCB. The electronic device 1210 may include a structure in which an antenna module 1211, a filter module 1212, and an RF processor 1213 are stacked in sequence. The RF components of the antennas and the RF processor may be implemented on a PCB, and filters may be repeatedly coupled in between the PCBs to form a plurality of layers.

The controller 1214 may control the overall operations of the electronic device 1210. The controller 1214 may include various communication modules for performing communications. The controller 1214 may include at least one processor such as a modem. The controller 1214 may include modules for digital signal processing. For example, the controller 1214 includes at least one modem. Upon data transmission, the controller 1214 performs encoding and modulating a transmit bit stream to generate complex symbols. Further, for example, upon data reception, the controller 1214 performs demodulating and decoding the baseband signal to restore a receive bit stream. The controller 1214 may perform protocol stack functions required by the communication standards.

With reference to FIG. 12, description has been made of the functional configuration of the electronic device 1210 as equipment capable of utilizing the antenna structure of the disclosure. However, the example shown in FIG. 12 is only of a configuration for utilizing the antenna structure according to various embodiments of the disclosure described with reference to FIGS. 1, 2A, 2B, 3, 4A, 4B, 5, 6A, 6B, 7, 8, 9 to 10, 11A and 11B, and the embodiments of the disclosure are not limited only to the components of the apparatus shown in FIG. 12. Accordingly, it is to be appreciated that the antenna module including the antenna structure, a communication equipment of other configuration, and the antenna structure itself may be incorporated into the embodiments of the disclosure.

The phase shifter according to embodiments of the disclosure can generate a phase difference through a dielectric plate (e.g., a circular dielectric plate) rotating between two output terminals of a two-way power divider. Since the phase shifter is included in each RF path for multiple antenna elements, its miniaturization is required. Through such a periodic structure included in the pattern of the power divider, it is possible to implement a further miniaturized phase shifter. For miniaturization, a slow-wave technique may be used.

The phase shifter according to embodiments of the disclosure may use a phase difference due to a change in distance between a dielectric and a conductive pattern (i.e., a metal pattern). Therefore, no metal-to-metal friction is generated, thereby resulting in low manufacturing errors. Further, as the dielectric moves between the branch point of the power divider and its respective output terminal, a 4-port phase shifter with highly flexible deployment may be implemented.

The phase shifter according to embodiments of the disclosure may provide phase shifting to each of a plurality of antenna elements. As shown in FIG. 2A, even if a relatively small number of ports (e.g., two in FIG. 2A) are vertically arranged, it is possible to secure a sufficient beam coverage corresponding to the vertical direction of the base station, through the 4-port phase shifter.

The conventional phase shifters have typically changed the permittivity of the transmission line, linearly moving the dielectric in a direction of the transmission line. However, the phase shifters are not flexibly arranged across two transmission lines. Therefore, it would be quite difficult for the above structure of the phase shifter to provide such a 4-port phase shifter according to the embodiments of the disclosure. Moreover, the phase shifter requires a footprint area corresponding to the length of the transmission line, and thus, a relatively larger area is required. The 4-port phase shifter according to the embodiments of the disclosure may provide a remarkable reduction in area of the phase shifter, through stubs for a rotating motion of a dielectric and a slow-wave effect. This is because the amount of phase variation per unit length increases as the inductance or capacitance component increases.

According to embodiments of the disclosure, a module including a phase shifter comprises a dielectric, a plate, and a printed circuit board (PCB) including a metal pattern. The metal pattern includes a power divider having a first transmission branch and a second transmission branch. The first transmission branch includes a first structure formed between a branch point of the power divider and an output terminal of the first transmission branch. The second transmission branch includes a second structure formed between the branch point of the power divider and the output terminal of the first transmission branch. The dielectric may be disposed to overlap at least one of at least a portion of the first structure or at least a portion of the second structure. The dielectric may be flexibly disposed so that a first region where the dielectric overlaps the first structure and a second region where the dielectric overlaps the second structure vary according to movement of the plate.

According to an embodiment, the dielectric may be arranged to rotate according to a linear movement of the plate.

According to an embodiment, the first structure includes a first connection for connecting the branch point of the power divider and the output terminal of the first transmission branch, and a first protrusion coupled to the first connection. The second structure includes a second connection for connecting the branch point of the power divider and the output terminal of the second transmission branch, and a second protrusion coupled to the second connection.

According to an embodiment, the first structure includes one or more first stubs for slow-wave. The second structure includes one or more second stubs for slow-wave.

According to an embodiment, the one or more first stubs may be periodically disposed along a main feeder line of the first transmission branch. The one or more second stubs may be periodically disposed along a main feeder line of the second transmission branch.

According to an embodiment, a shape of the dielectric may be a pillar shape having a cross-section substantially perpendicular to a rotation axis of the dielectric. The rotation axis may be located in between the first structure and the second structure.

According to an embodiment, the output terminal of the first transmission branch may be electrically connected to first antenna elements of an array antenna. The output terminal of the second transmission branch may be electrically connected to second antenna elements of the array antenna, the second antenna elements being different from the first antenna elements.

According to an embodiment, the metal pattern may be plated on one surface of the PCB.

According to an embodiment, the module further includes a rack coupled to the plate and a gear for rotating the dielectric based on a linear movement of the plate. The gear may be coupled to the rack and the dielectric.

According to an embodiment, a phase difference between the first output of the first transmission branch and the second output of the first transmission branch in a state in which the plate is disposed in a first position may be different from a phase difference between the first output of the first transmission branch and the second output of the first transmission branch in a state in which the plate is disposed in a second position.

According to embodiments of the disclosure, an electronic device comprises a power source, at least one processor, at least one filter, an antenna printed circuit board (PCB), and an array antenna including a plurality of sub-arrays. The antenna PCB includes a dielectric, a plate, and a PCB including a metal pattern, for each sub-array. The metal pattern includes a power divider having a first transmission branch and a second transmission branch. The first transmission branch includes a first structure formed between a branch point of the power divider and an output terminal of the first transmission branch. The second transmission branch includes a second structure formed between the branch point of the power divider and the output terminal of the first transmission branch. The dielectric may be disposed to overlap at least one of at least a portion of the first structure or at least a portion of the second structure. The dielectric may be flexibly disposed so that a first region where the dielectric overlaps the first structure and a second region where the dielectric overlaps the second structure vary according to movement of the plate.

According to an embodiment, the dielectric may be arranged to rotate according to a linear movement of the plate.

According to an embodiment, the first structure includes a first connection for connecting the branch point of the power divider and the output end of the first transmission branch, and a first protrusion coupled to the first connection. The second structure includes a second connection for connecting the branch point of the power divider and the output terminal of the second transmission branch, and a second protrusion coupled to the second connection portion.

According to an embodiment, the first structure includes one or more first stubs for slow-wave. The second structure includes one or more second stubs for slow-wave.

According to an embodiment, the one or more first stubs may be periodically arranged along a main feeder line of the first transmission branch. The one or more second stubs may be periodically disposed along a main feeder line of the second transmission branch.

According to an embodiment, a shape of the dielectric may be a pillar shape having a cross-section substantially perpendicular to a rotational axis of the dielectric. The rotation axis may be located in between the first structure and the second structure.

According to an embodiment, the output terminal of the first transmission branch may be electrically connected to first antenna elements of an array antenna. The output terminal of the second transmission branch may be electrically connected to second antenna elements of the array antenna, the second antenna elements being different from the first antenna elements.

According to an embodiment, the metal pattern may be plated on one surface of the PCB.

According to an embodiment, the electronic device further includes a rack coupled to the plate and a gear for rotating the dielectric based on a linear movement of the plate. The gear may be coupled to the rack and the dielectric.

According to an embodiment, a phase difference between the first output of the first transmission branch and the second output of the first transmission branch in a state in which the plate is disposed in a first position may be different from a phase difference between the first output of the first transmission branch and the second output of the first transmission branch in a state in which the plate is disposed in a second position.

According to an embodiment, the electronic device includes a radio frequency (RF) processor. The RF processor may include a plurality of RF paths.

According to an embodiment, an RF path of the plurality of RF paths is a path through which a signal received through an antenna is received or a signal radiated through an antenna is transmitted.

According to an embodiment, the RF processor includes an up-converter configured to up-convert a baseband digital transmit signal to a transmit frequency and a digital-to-analog converter (DAC) configured to convert an up-converted digital transmit signal into an analog RF transmit signal.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that may be accessed via a communication network such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a proposed specific embodiment. However, such a singular or plural expression may be selected appropriately for the presented context for the convenience of description, and the disclosure is not limited to the singular form or the plural elements. Therefore, either an element expressed in the plural form may be formed of a singular element, or an element expressed in the singular form may be formed of plural elements.

Meanwhile, specific embodiments have been described in the detailed description of the disclosure, but it goes without saying that various modifications are possible without departing from the scope of the disclosure.

What is claimed is:

1. A module including at least one phase shifter, the module comprising:

a plate;

a dielectric coupled to the plate; and a printed circuit board (PCB) comprising a metal pattern, wherein the metal pattern comprises a power divider having a first transmission branch extending from a branch point of the power divider and a second transmission branch extending from the branch point of the power divider, wherein the first transmission branch comprises a first structure formed between the branch point of the power divider and an output terminal of the first transmission branch, wherein the second transmission branch comprises a second structure formed between the branch point of the power divider and an output terminal of the second transmission branch, wherein the output terminal of the first transmission branch is electrically connected to first antenna elements of a sub-array, wherein the output terminal of the second transmission branch is electrically connected to second antenna elements of the sub-array, different from the first antenna elements of the sub-array, wherein the dielectric is disposed to overlap at least one of at least a portion of the first structure or at least a portion of the second structure, wherein, in case that a first region where the dielectric overlaps the first structure expands according to movement of the plate, a second region where the dielectric overlaps the second structure shrinks, and wherein, in case that the first region shrinks according to the movement of the plate, the second region expands.

2. The module of claim 1, wherein the dielectric is configured to rotate from a first position, in which the dielectric overlaps only the first structure of the first transmission branch, to a second position in which the dielectric overlaps only the second structure of the second transmission branch or rotate from the second position to the first position.

3. The module of claim 1, wherein the first structure comprises a first connection portion for connecting the branch point of the power divider and the output terminal of the first transmission branch, and a first protrusion portion coupled to the first connection portion, and wherein the second structure comprises a second connection portion for connecting the branch point of the power divider and the output terminal of the second transmission branch, and a second protrusion portion coupled to the second connection portion.

4. The module of claim 1, wherein the first structure comprises one or more first stubs for slow-wave, and wherein the second structure comprises one or more second stubs for slow-wave.

5. The module of claim 4, wherein the one or more first stubs are periodically disposed along a main feeder line of the first transmission branch, and wherein the one or more second stubs are periodically disposed along a main feeder line of the second transmission branch.

6. The module of claim 1, wherein a rotation axis is located in between the first structure and the second structure.

7. The module of claim 1, wherein the metal pattern is plated on one surface of the PCB.

8. The module of claim 1, further comprising:
a rack coupled to the plate; and
a gear for rotating the dielectric based on a linear movement of the plate,
wherein the gear is coupled to the rack and the dielectric.

9. The module of claim 1, wherein a phase difference between a first output of the first transmission branch and a second output of the second transmission branch in a state in which the plate is disposed in a first position is different from a phase difference between the first output of the first transmission branch and the second output of the second transmission branch in a state in which the plate is disposed in a second position.

10. An electronic device, comprising:
a power source;
at least one processor;
at least one filter;
an antenna printed circuit board (PCB); and
an array antenna comprising a plurality of sub-arrays,
wherein, for each sub-array, the antenna PCB comprises:
a plate,
a dielectric coupled to the plate, and
a PCB comprising a metal pattern,
wherein the metal pattern comprises a power divider having a first transmission branch extending from a branch point of the power divider and a second transmission branch extending from the branch point of the power divider,
wherein the first transmission branch comprises a first structure formed between the branch point of the power divider and an output terminal of the first transmission branch,
wherein the second transmission branch comprises a second structure formed between the branch point of the power divider and an output terminal of the second transmission branch,
wherein the output terminal of the first transmission branch is electrically connected to first antenna elements of a sub-array of the array antenna,
wherein the output terminal of the second transmission branch is electrically connected to second antenna elements of the sub-array, different from the first antenna elements of the sub-array,
wherein the dielectric is disposed to overlap at least one of at least a portion of the first structure or at least a portion of the second structure,
wherein, in case that a first region where the dielectric overlaps the first structure expands according to movement of the plate, a second region where the dielectric overlaps the second structure shrinks, and
wherein, in case that the first region shrinks according to the movement of the plate, the second region expands.

11. The electronic device of claim 10, wherein the dielectric is configured to rotate from a first position, in which the dielectric overlaps only the first structure of the first transmission branch, to a second position in which the dielectric overlaps only the second structure of the second transmission branch or rotate from the second position to the first position.

12. The electronic device of claim 10,
wherein the first structure comprises a first connection portion for connecting the branch point of the power divider and the output terminal of the first transmission branch, and a first protrusion portion coupled to the first connection portion, and
wherein the second structure comprises a second connection portion for connecting the branch point of the power divider and the output terminal of the second transmission branch, and a second protrusion portion coupled to the second connection portion.

13. The electronic device of claim 10,
wherein the first structure comprises one or more first stubs for slow-wave, and
wherein the second structure comprises one or more second stubs for slow-wave.

14. The electronic device of claim 13,
wherein the one or more first stubs are periodically disposed along a main feeder line of the first transmission branch, and
wherein the one or more second stubs are periodically disposed along a main feeder line of the second transmission branch.

15. The electronic device of claim 10, wherein a rotation axis is located in between the first structure and the second structure.

16. The electronic device of claim 10, wherein the metal pattern is plated on one surface of the PCB.

17. The electronic device of claim 10, further comprising:
a rack coupled to the plate; and
a gear for rotating the dielectric based on a linear movement of the plate,
wherein the gear is coupled to the rack and the dielectric.

18. The electronic device of claim 10, wherein a phase difference between a first output of the first transmission branch and a second output of the second transmission branch in a state in which the plate is disposed in a first position is different from a phase difference between the first output of the first transmission branch and the second output of the second transmission branch in a state in which the plate is disposed in a second position.

* * * * *